US012784578B2

(12) United States Patent
Tamagawa et al.

(10) Patent No.: US 12,784,578 B2
(45) Date of Patent: Nov. 3, 2026

(54) REMOTE OPERATION SYSTEM, REMOTE OPERATION MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Shuichi Tamagawa, Kitanagoya (JP); Yuki Suehiro, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/974,040

(22) Filed: Dec. 9, 2024

(65) Prior Publication Data

US 2025/0191462 A1 Jun. 12, 2025

(30) Foreign Application Priority Data

Dec. 12, 2023 (JP) ................................ 2023-209378

(51) Int. Cl.
*G08G 1/01* (2006.01)
*G08G 1/09* (2006.01)

(52) U.S. Cl.
CPC .......... *G08G 1/0112* (2013.01); *G08G 1/091* (2013.01)

(58) Field of Classification Search
None
See application file for complete search history.

(56) References Cited

U.S. PATENT DOCUMENTS 11,215,982 B2 1/2022 Urano et al.
11,325,618 B2 5/2022 Umeda
2007/0212031 A1* 9/2007 Hikita .................... H04N 21/23 348/E7.086
2019/0061619 A1* 2/2019 Reymann ................. B60Q 9/00
2019/0137999 A1 5/2019 Taguchi et al.
2019/0163176 A1* 5/2019 Wang ................... G05D 1/0027
2019/0265710 A1 8/2019 Kaneko et al.
2020/0062267 A1 2/2020 Magzimof et al.
2020/0170227 A1* 6/2020 Rishi .................... G06N 3/0985
2020/0209888 A1 7/2020 Sakai et al.
2020/0326702 A1 10/2020 Iwamoto et al.
2021/0041894 A1 2/2021 Urano et al.
(Continued)

FOREIGN PATENT DOCUMENTS

JP 2020042764 A 3/2020
JP 2023028366 A 3/2023
(Continued)

*Primary Examiner* — Daniel L Greene
(74) *Attorney, Agent, or Firm* — Hunton Andrews Kurth LLP

(57) ABSTRACT

A remote operation system of remote operation of a mobility, the remote operation system includes one or more processors configured to: acquire terminal specification information indicating specifications of each of a plurality of remote operator terminals; acquire required capability information indicating at least a required terminal specification that is a specification required for the remote operation of a target mobility; and assign a first remote operator terminal that meets the required terminal specification out of the remote operator terminals to the remote operation of the target mobility, based on the terminal specification information and the required terminal specification.

7 Claims, 17 Drawing Sheets

(56) References Cited

U.S. PATENT DOCUMENTS

| | | | |
|---|---|---|---|
| 2021/0055741 | A1 | 2/2021 | Kawanai et al. |
| 2021/0058173 | A1 | 2/2021 | Otaki et al. |
| 2021/0072743 | A1 | 3/2021 | Otaki et al. |
| 2021/0080943 | A1 | 3/2021 | Iwamoto et al. |
| 2023/0017458 | A1 | 1/2023 | Fukudome et al. |
| 2024/0391112 | A1 | 11/2024 | Hirai et al. |

FOREIGN PATENT DOCUMENTS

| | | | |
|---|---|---|---|
| WO | 2018087880 | A1 | 5/2018 |
| WO | 2023053520 | A1 | 4/2023 |

* cited by examiner

FIG. 2

| MOBILITY | CONTENT OF REQUESTS (CONTENT OF REQUESTED REMOTE OPERATIONS) |
|---|---|
| VEHICLE | [DRIVING] MOVE FROM DEPARTURE POINT TO DESTINATION ON PUBLIC ROAD |
| VEHICLE | [PARKING] PARK IN PARKING SPACE IN PARKING LOT |
| VEHICLE | [AUTOMATED DRIVING ASSIST] SAFELY PULL OVER TO NEARBY ROAD SHOULDER WHEN UNABLE TO PERFORM AUTOMATED DRIVING |
| FORKLIFT | [OPERATION] LOAD, UNLOAD |
| POWER SHOVEL | [OPERATION] MINE AT DESIGNATED LOCATION |
| WATERCRAFT | [STEERING] DOCK |
| FLYING OBJECT | [DELIVER] MOVE FROM DEPARTURE POINT TO DESTINATION |

<EXAMPLES OF OPERATOR STATE AND OPERATOR SCORE>

| HEALTH STATE | NORMAL | ALERT | ABNORMAL |
|---|---|---|---|
| FIRST OPERATOR SCORE | 100 | 0 | -100 |

| AMOUNT OF WORKING TIME (MIN) | 60 | 120 | 150 | 180 | 200 | 220 |
|---|---|---|---|---|---|---|
| SECOND OPERATOR SCORE | 30 | 10 | 0 | 0 | -20 | -50 |

| HOURLY WAGE (YEN) | 900 | 1000 | 1500 | 2000 | 2500 | 3000 |
|---|---|---|---|---|---|---|
| THIRD OPERATOR SCORE | 30 | 20 | 10 | 5 | 3 | 1 |

FIG. 10

<EXAMPLES OF TERMINAL STATE AND TERMINAL SCORE>

| | | | | | | |
|---|---|---|---|---|---|---|
| COMMUNICATION STATE (Mbps) | 0.5 | 1.0 | 1.5 | 2.0 | 2.5 | 3 |
| FIRST TERMINAL SCORE | 0 | 3 | 6 | 9 | 12 | 15 |
| COMMUNICATION STATE (Mbps) | 3.5 | 4.0 | 4.5 | 5 | 5.5 | 6.0 |
| FIRST TERMINAL SCORE | 18 | 21 | 24 | 27 | 30 | 33 |

| | | | |
|---|---|---|---|
| CONTROL DEVICE STATE | NORMAL | ALERT | ABNORMAL |
| SECOND TERMINAL SCORE | 50 | 0 | -100 |

FIG. 13

<LIC: OPERATOR LICENSE INFORMATION>

| | VEHICLE (SMALL) | VEHICLE (STANDARD) | VEHICLE (LARGE) | VEHICLE (SPECIAL) | WATERCRAFT |
|---|---|---|---|---|---|
| O-1 | ○ | × | × | × | × |
| O-2 | × | ○ | × | × | × |
| O-3 | ○ | ○ | ○ | × | × |
| O-4 | ○ | ○ | × | ○ | × |
| O-5 | × | × | × | × | ○ |
| O-6 | × | ○ | ○ | × | ○ |
| ⋮ | ⋮ | ⋮ | ⋮ | ⋮ | ⋮ |

FIG. 15

<SPC: TERMINAL SPECIFICATION INFORMATION>

| | SUPPORTED MOBILITIES | CONTENT OF SUPPORTED REMOTE OPERATIONS (SERVICES) |
|---|---|---|
| 200-A (VEHICLE COCKPIT) | VEHICLES (SMALL, STANDARD, LARGE) | DRIVING<br>PARKING<br>AUTOMATED DRIVING ASSIST<br>... |
| 200-B (VEHICLE COCKPIT) | VEHICLES (SMALL, STANDARD, LARGE) | DRIVING<br>PARKING<br>AUTOMATED DRIVING ASSIST<br>... |
| 200-C (TABLET) | VEHICLES<br>SMALL VEHICLES<br>CONSTRUCTION MACHINES | AUTOMATED DRIVING ASSIST<br>OPERATION<br>... |
| 200-D (FORKLIFT COCKPIT) | FORKLIFTS | OPERATION |
| ⋮ | ⋮ | ⋮ |

FIG. 17

<REQ-SPC: REQUIRED TERMINAL SPECIFICATIONS>

| MOBILITY TYPE | REQUIRED OPERATION SYSTEM CAPABILITIES |
|---|---|
| 100-A (VEHICLE) | - ACCELERATOR → FORWARD AND REVERSE OPERATION × 1<br>- BRAKE → FORWARD AND REVERSE OPERATION × 1<br>- STEER → LATERAL OPERATION × 1, FB REQUIRED |
| 100-B (WATERCRAFT) | - OUTPUT → FORWARD AND REVERSE OPERATION × 2<br>- STEER → LATERAL OPERATION × 1 |
| 100-C (CONSTRUCTION MACHINE) | - ARM OPERATION → FORWARD AND REVERSE OPERATION × 2, FB REQUIRED<br>LATERAL OPERATION × 2, FB REQUIRED<br>- FORWARD AND REVERSE → FORWARD AND REVERSE OPERATION × 2 |

<SPC: TERMINAL SPECIFICATION INFORMATION>

| | OPERATION SYSTEM INFORMATION |
|---|---|
| 200-A (VEHICLE COCKPIT) | - FORWARD AND REVERSE OPERATION × 2 (ACCELERATOR PEDAL, BRAKE PEDAL)<br>- LATERAL OPERATION × 1 (STEERING WHEEL)<br>- LATERAL OPERATION WITH FB |
| 200-B (SIMPLE COCKPIT) | - FORWARD AND REVERSE OPERATION × 2 (JOYSTICK)<br>- LATERAL OPERATION × 1 (JOYSTICK)<br>- FORWARD AND REVERSE OPERATION WITH FB, LATERAL OPERATION WITH FB |
| 200-C (TABLET) | - FORWARD AND REVERSE OPERATION × 2, LATERAL OPERATION × 2 (DIRECTIONAL PAD × 2)<br>- FORWARD AND REVERSE OPERATION × 4<br>...<br>(* UI CAN BE SET AS DESIRED) |

FIG. 18

<REQ-SPC: REQUIRED TERMINAL SPECIFICATIONS>

| MOBILITY TYPE AND CONTENT OF REMOTE OPERATION | REQUIRED DISPLAY SYSTEM CAPABILITIES |
|---|---|
| 100-D (VEHICLE)<br>DRIVING | - NUMBER OF MONITORS: 3 OR MORE<br>- FORWARD VIDEO × 3 (FRONT, FRONT RIGHT, FRONT LEFT)<br>- MIRROR VIDEO × 3 (RIGHT, LEFT, REAR) |
| 100-E (VEHICLE)<br>PARKING | - NUMBER OF MONITORS: 1 OR MORE<br>- VIDEO OF SURROUNDINGS × 4 (FRONT, RIGHT, LEFT, REAR) |
| 100-F (CONSTRUCTION MACHINE)<br>OPERATION | - NUMBER OF MONITORS: 1 OR MORE<br>- FORWARD VIDEO × 3 (FRONT, RIGHT, LEFT)<br>- VIDEO BELOW CONSTRUCTION MACHINE × 1 |

<SPC: TERMINAL SPECIFICATION INFORMATION>

| | DISPLAY SYSTEM INFORMATION |
|---|---|
| 200-D<br>(VEHICLE COCKPIT) | - NUMBER OF MONITORS: 3<br>- RESOLUTION: 1920 × 1080<br>- SUPPORT PIC-IN-PIC<br>- NUMBER OF DISPLAYABLE VIDEOS: 9 |
| 200-E<br>(SIMPLE COCKPIT) | - NUMBER OF MONITORS: 1<br>- RESOLUTION: 3840 × 2160<br>- NUMBER OF DISPLAYABLE VIDEOS: 4 |
| 200-F<br>(TABLET) | - NUMBER OF MONITORS: 1<br>- RESOLUTION: 2560 × 1600<br>- NUMBER OF DISPLAYABLE VIDEOS: 4 |

REMOTE OPERATION SYSTEM, REMOTE OPERATION MANAGEMENT METHOD, AND NON-TRANSITORY STORAGE MEDIUM

CROSS-REFERENCE TO RELATED APPLICATION

This application claims priority to Japanese Patent Application No. 2023-209378 filed on Dec. 12, 2023, incorporated herein by reference in its entirety.

BACKGROUND

1. Technical Field

The present disclosure relates to a remote operation system, a remote operation management method, and a non-transitory storage medium.

2. Description of Related Art

US Unexamined Patent Application Publication No. 2020/0062267 discloses a system for remote operation of a vehicle. The system assigns a suitable remote operator to remote operation of the vehicle, based on the skills and experiences of remote operators.

SUMMARY

It is herein assumed that a remote operator remotely operates a mobility. The specifications required for a remote operator terminal that is used by the remote operator may vary depending on the type of target mobility and the content of requested remote operation. If a remote operator terminal that does not meet the specifications required for remote operation of the target mobility is assigned to remote operation of the target mobility, the accuracy of remote operation will decrease.

The present disclosure provides a technique that can ensure the accuracy of remote operation of a mobility.

A remote operation system according to a first aspect of the present disclosure is a remote operation system of remote operation of a mobility, the remote operation system includes one or more processors configured to: acquire terminal specification information indicating specifications of each of a plurality of remote operator terminals; acquire required capability information indicating at least a required terminal specification that is a specification required for the remote operation of a target mobility; and assign a first remote operator terminal that meets the required terminal specification out of the remote operator terminals to the remote operation of the target mobility, based on the terminal specification information and the required terminal specification.

A remote operation management method according to a second aspect of the present disclosure is a remote operation management method of managing remote operation of a mobility by a computer, the remote operation management method includes: acquiring terminal specification information indicating specifications of each of a plurality of remote operator terminals; acquiring required capability information indicating at least a required terminal specification that is a specification required for the remote operation of a target mobility; and assigning a first remote operator terminal that meets the required terminal specification out of the remote operator terminals to the remote operation of the target mobility, based on the terminal specification information and the required terminal specification.

A non-transitory storage medium according to a third aspect of the present disclosure is a non-transitory storage medium storing instructions of managing remote operation of a mobility that are executable by one or more processors and that cause the one or more processors to perform functions includes: acquiring terminal specification information indicating specifications of each of a plurality of remote operator terminals; acquiring required capability information indicating at least a required terminal specification that is a specification required for the remote operation of a target mobility; and assigning a first remote operator terminal that meets the required terminal specification out of the remote operator terminals to the remote operation of the target mobility, based on the terminal specification information and the required terminal specification.

According to the present disclosure, the specifications of the individual remote operator terminals and the required terminal specification required for the remote operation of the target mobility are taken into consideration. The first remote operator terminal that meets the required terminal specification is assigned to the remote operation of the target mobility. This ensures the accuracy of the remote operation of the target mobility.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 shows examples of the content of various remote operations that are requested to various mobilities;

FIG. 10 is a conceptual diagram showing examples of a terminal state and a terminal score;

FIG. 13 is a conceptual diagram showing an example of operator license information;

FIG. 15 is a conceptual diagram showing an example of terminal specification information;

FIG. 17 is a conceptual diagram showing an example of terminal specification information and required terminal specifications related to an operation system; and FIG. 18 is a conceptual diagram showing an example of terminal specification information and required terminal specifications related to a display system.

DETAILED DESCRIPTION OF EMBODIMENTS

An embodiment of the present disclosure will be described with reference to the accompanying drawings.

1. Overview of Remote Operation System

Figure 1:
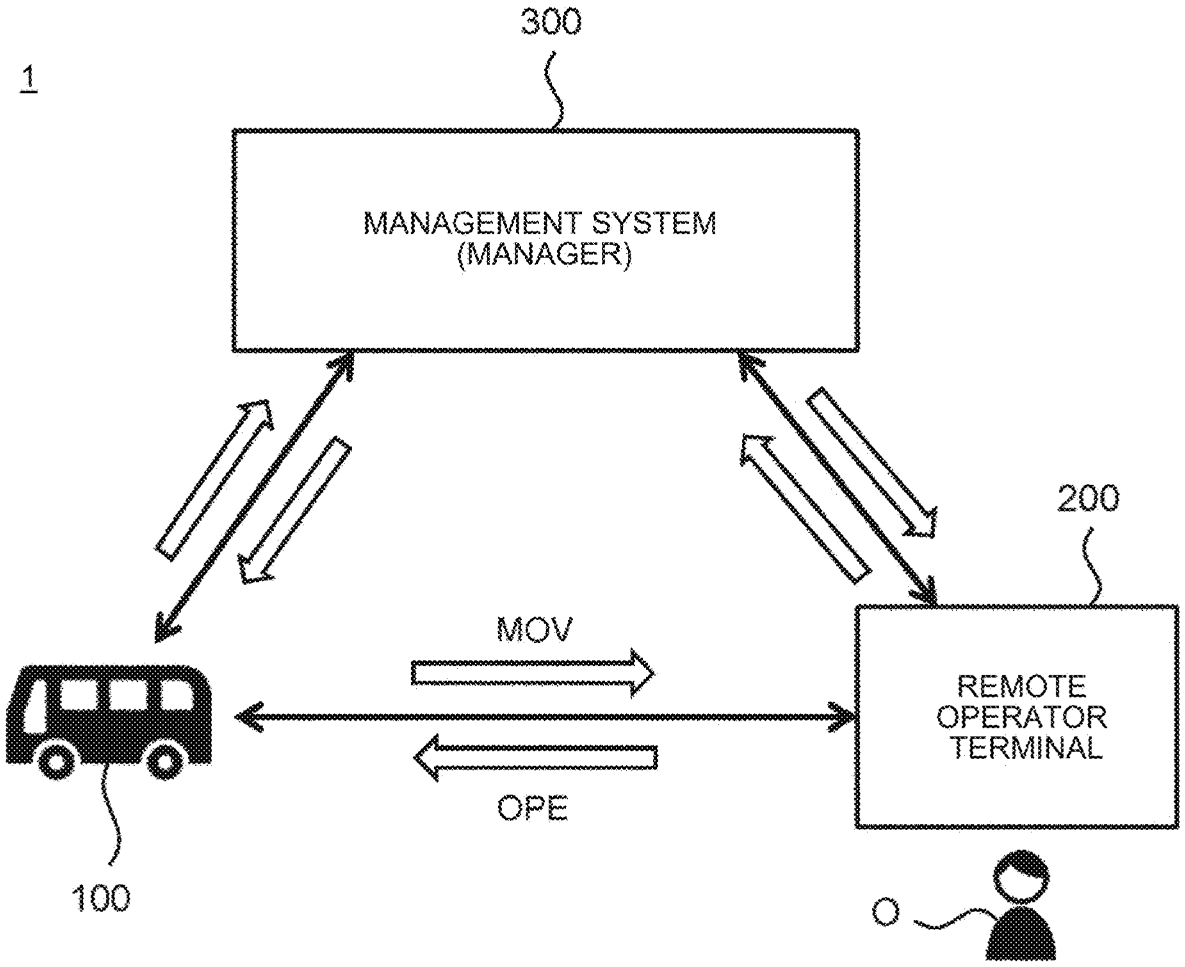
FIG. 1 is a conceptual diagram illustrating an overview of a remote operation system.

FIG. 1 is a conceptual diagram illustrating an overview of a remote operation system 1 according to the present embodiment. The remote operation system 1 is a system for remote operation of a mobility 100. Remote operation is a concept including remote driving. The remote operation system 1 includes the mobility 100, a remote operator terminal 200, and a management system 300.

The mobility 100 is a moving object that can move. The mobility 100 may be manually operated by an operator in the mobility 100. The mobility 100 may have an autonomous moving function. In any case, the mobility 100 is configured to be operated even remotely as needed. That is, the mobility 100 is an object to be remotely operated by the remote operation system 1.

The number of types of mobility 100 to be remotely operated is not limited to one, and may be two or more. For example, the mobility 100 is a vehicle that travels on public roads (e.g., a passenger car, a truck, a bus, a Mobility as a Service (MaaS) vehicle, an automated driving vehicle, etc.). As another example, the mobility 100 may be a vehicle that is used in a factory (e.g., a forklift, an industrial dolly, etc.). As still another example, the mobility 100 may be a special small vehicle (e.g., a golf cart, a personal mobility, an electric wheelchair, etc.). As yet another example, the mobility 100 may be a construction machine (e.g., a power shovel, a bulldozer, etc.). As a further example, the mobility 100 may be a robot (e.g., a logistics robot, a work robot, etc.). As a still further example, the mobility 100 may be a flying object (e.g., a drone, etc.). As a yet further example, the mobility 100 may be a watercraft (e.g., a small boat, a large cruise ship, etc.). As a yet further example, the mobility 100 may be a ride in an amusement park (e.g., a cart, an attraction, etc.).

FIG. 2 shows examples of the content of various remote operations that are requested to various mobilities 100. As illustrated in FIG. 2, there are a variety of types of mobilities 100, and a variety of types of remote operations are requested to such mobilities 100. A remote operation may be requested by the mobility 100 itself, or may be requested by a service provider affiliated with the remote operation system 1. In the latter case, the content of the remote operation can also be said to be the content of a service provided by 10 the service provider.

The remote operator terminal 200 is a terminal device that a remote operator O uses when remotely operating the mobility 100. That is, the remote operator terminal 200 is configured to be used by the remote operator O for remote operation of the mobility 100. Examples of the remote operator terminal 200 include a cockpit-type terminal, a personal computer (PC), a tablet, and a smartphone. A single remote operator terminal 200 may be configured to support remote operation of various types of mobilities 100. Alternatively, a single remote operator terminal 200 may be dedicated to remote operation of a specific mobility 100. The combination of the remote operator O and the remote operator terminal 200 may be determined in advance, or may be changeable as desired. That is, a single remote operator terminal 200 may be used only by a specific remote operator O, or may be used by various remote operators O in turns.

The management system (manager) 300 manages the remote operation system 1. The management system 300 may be composed of a plurality of servers that performs distributed processing. For example, the management system 300 manages a plurality of remote operators O and a plurality of remote operator terminals 200. The management system 300 assigns a remote operator O and a remote operator terminal 200 to remote operation of a mobility 100, in response to a remote operation request. The management system 300 may also manage the state of the mobility 100 during remote operation. The management system 300 will be described in detail later.

The mobility 100, the remote operator terminal 200, and the management system 300 can communicate with each other via a communication network. For example, the mobility 100 can wirelessly communicate with the remote operator terminal 200 and the management system 300 via a wireless communication network. The remote operator terminal 200 and the management system 300 can communicate with each other via a wired communication network or a wireless communication network. The mobility 100 and the remote operator terminal 200 may communicate with each other via the management system 300, or may communicate directly with each other without via the management system 300.

The flow of information during remote operation of the mobility 100 is roughly as follows.

The mobility 100 is equipped with various sensors including a camera. The camera captures a video of the surroundings of the mobility 100. The video of the surroundings of the mobility 100 is thus obtained by the camera. Mobility information MOV is information obtained by various sensors, and includes at least the video captured by the camera. The mobility information MOV may include the location and state (e.g., speed, steering angle, etc.) of the mobility 100. The mobility 100 sends the mobility information MOV to the remote operator terminal 200.

The remote operator terminal 200 receives the mobility information MOV sent from the mobility 100. The remote operator terminal 200 presents the mobility information MOV to the remote operator O. Specifically, the remote operator terminal 200 is equipped with a display device, and displays the video etc. on the display device. The remote operator O grasps the surroundings of the mobility 100 by looking at the displayed information, and remotely operates the mobility 100. Remote operation information OPE is information about remote operation by the remote operator O (steering operation, acceleration operation, deceleration operation, forward and reverse movement operation, lateral movement operation, etc.). For example, the remote operation information OPE includes an amount of operation input by the remote operator O. The remote operation information OPE can be said to be information reflecting the degree of remote operation by the remote operator O. The remote operator terminal 200 sends the remote operation information OPE to the mobility 100.

The mobility 100 receives the remote operation information OPE sent from the remote operator terminal 200. The mobility 100 performs mobility control according to the received remote operation information OPE. Remote operation of the mobility 100 is implemented in this manner.

Figure 3:
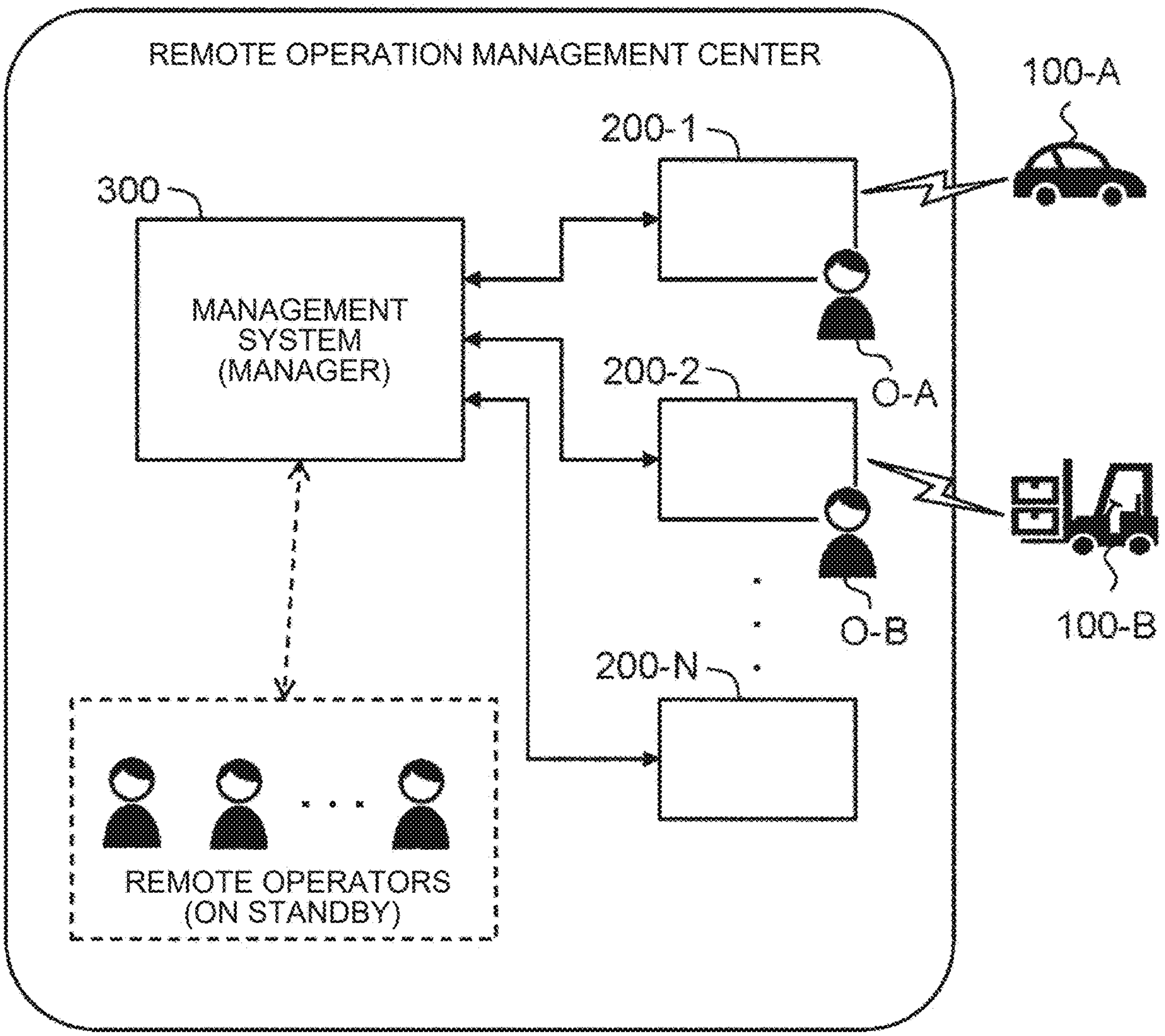
FIG. 3 is a conceptual diagram showing an example of the configuration of the remote operation system.

FIG. 3 is a conceptual diagram showing an example of the configuration of the remote operation system 1. In the example shown in FIG. 3, a remote operation management center is located on a predetermined site or in a predetermined building. The management system 300 and a plurality of remote operator terminals 200 (200-1 to 200-N, where N is an integer of 2 or more) are installed in the remote operation management center. A plurality of remote operators O works at the remote operation management center. The management system 300 monitors and manages the states of the remote operator terminals 200 located in the remote operation management center. The management system 300 also monitors and manages the states of the remote operators O located in the remote operation management center.

2. Configuration

2-1. Configuration Example of Mobility

Figure 4:
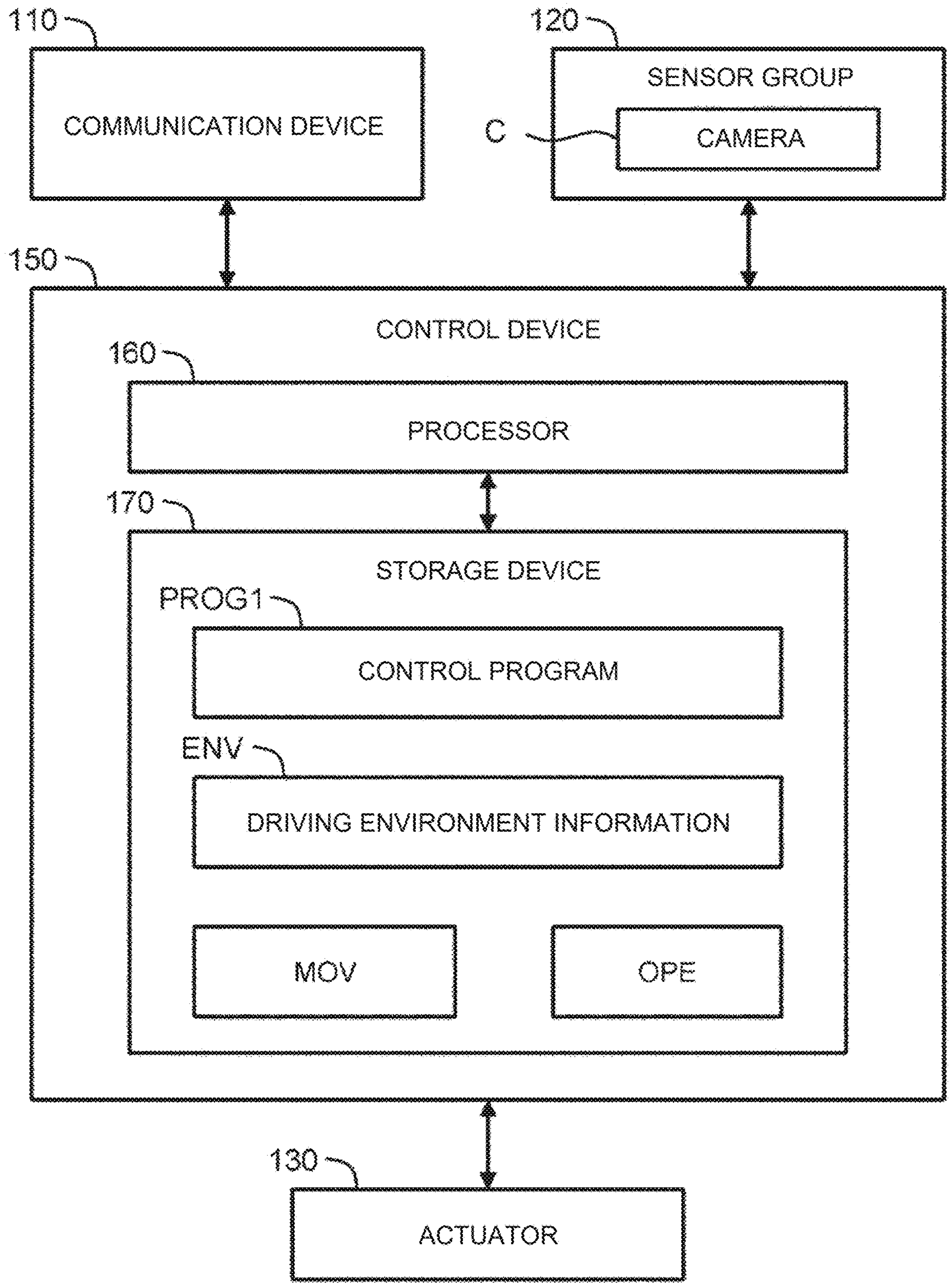
FIG. 4 is a block diagram showing an example of the configuration of a mobility.

FIG. 4 is a block diagram showing an example of the configuration of the mobility 100. The mobility 100 includes a communication device 110, a sensor group 120, one or more actuators 130, and a control device 150.

The communication device 110 wirelessly communicates with the outside of the mobility 100. For example, the communication device 110 wirelessly communicates with the remote operator terminal 200 and the management system 300.

The sensor group 120 includes a perception sensor, a mobility state sensor, and a location sensor. The perception sensor perceives (detects) the surroundings of the mobility 100. Examples of the perception sensor include a camera C, a Laser Imaging Detection and Ranging (LIDAR) sensor, and a radar. The mobility state sensor detects the state of the mobility 100. The mobility state sensor includes a speed sensor, an acceleration sensor, a yaw rate sensor, and a steering angle sensor. The location sensor detects the location and orientation of the mobility 100. For example, the location sensor includes a Global Navigation Satellite System (GNSS).

The actuator 130 moves the mobility 100. For example, the actuator 130 includes a forward and reverse movement actuator for moving (accelerating and decelerating) the mobility 100 forward and backward. As another example, the actuator 130 may include a lateral movement actuator for moving the mobility 100 laterally. As still another example, when the mobility 100 is equipped with an arm, the actuator 130 may include an arm actuator for moving the arm.

For example, when the mobility 100 is a common vehicle, the actuator 130 includes a steering device, a drive device, and a braking device. The steering device steers wheels. For example, the steering device includes an electric power steering (EPS) system. The drive device is a power source that generates a driving force. Examples of the drive device include an engine, an electric motor, and an in-wheel motor. The braking device generates a braking force.

The control device 150 is a computer that controls the mobility 100. The control device 150 includes one or more processors 160 (hereinafter simply referred to as "processor 160") and one or more storage devices 170 (hereinafter simply referred to as "storage device 170"). The processor 160 performs various processes. Examples of the processor 160 include a general purpose processor, a special purpose processor, a central processing unit (CPU), a graphics processing unit (GPU), an application-specific integrated circuit (ASIC), a field-programmable gate array (FPGA), an integrated circuit, a conventional circuit, and/or combinations thereof. The processor 160 can also be referred to as "circuitry" or "processing circuitry." Circuitry is hardware programmed to implement the described functions, or hardware that performs the functions. The storage device 170 stores various kinds of information. Examples of the storage device 170 include a volatile memory, a nonvolatile memory, a hard disk drive (HDD), and a solid state drive (SSD).

A control program PROG1 is a computer program that is executed by the processor 160. The functions of the control device 150 may be implemented through cooperation between the processor 160 that executes the control program PROG1 and the storage device 170. The control program PROG1 is stored in the storage device 170. Alternatively, the control program PROG1 may be recorded on a computer-readable recording medium.

The control device 150 acquires driving environment information ENV indicating the driving environment of the mobility 100. The driving environment information ENV is stored in the storage device 170.

The driving environment information ENV includes surroundings information indicating the perception results from the perception sensor. For example, the surroundings information includes a video captured by the camera C. The surroundings information may include object information on objects around the mobility 100. Examples of the objects around the mobility 100 include pedestrians, other vehicles (preceding vehicles, parked vehicles, etc.), white lines, stop lines, traffic lights, signs, and roadside structures. The object information indicates the relative positions and relative speeds of the objects with respect to the mobility 100. For example, the objects can be identified and the relative positions of the objects can be calculated by analyzing the video obtained by the camera. Alternatively, the objects can be identified and the relative positions and relative speeds of the objects can be acquired based on point cloud information obtained by a LIDAR sensor.

The driving environment information ENV may include mobility state information indicating the detection results from the mobility state sensor. The mobility state information indicates the speed, acceleration (longitudinal acceleration, lateral acceleration), yaw rate, steering angle, etc. of the mobility 100.

The driving environment information ENV may further include location information indicating the location and moving direction (orientation) of the mobility 100. The location information is obtained by the location sensor. Accurate location information may be acquired by localization using map information and the surroundings information (object information).

The control device 150 performs movement control to control movement of the mobility 100. The movement control includes forward and reverse movement control and lateral movement control. The control device 150 performs the movement control by controlling the actuator 130.

The control device 150 may perform autonomous movement control based on the driving environment information ENV. More specifically, the control device 150 generates a movement plan for the mobility 100 based on the driving environment information ENV. The control device 150 also generates a target trajectory that is necessary for the mobility 100 to travel according to the movement plan, based on the driving environment information ENV. The target trajectory includes a target location and a target speed. The control device 150 then performs the movement control so that the mobility 100 follows the target trajectory.

When remote operation of the mobility 100 is performed, the control device 150 communicates with the remote operator terminal 200 via the communication device 110.

The control device 150 sends the mobility information MOV to the remote operator terminal 200. The mobility information MOV is information necessary for the remote operator O to remotely operate the mobility 100, and includes at least part of the driving environment information ENV described above. In particular, the mobility information MOV includes the video captured by the camera C. The mobility information MOV may include other surroundings information. The mobility information MOV may include the mobility state information. The mobility information MOV may include the location information.

The control device 150 receives the remote operation information OPE from the remote operator terminal 200. The remote operation information OPE is information about remote operation by the remote operator O (steering operation, acceleration operation, deceleration operation, forward and reverse movement operation, lateral movement operation, etc.). For example, the remote operation information OPE includes an amount of operation input by the remote operator O. The control device 150 performs the movement control according to the received remote operation information OPE.

2-2. Configuration Example of Remote Operator Terminal

Figure 5:
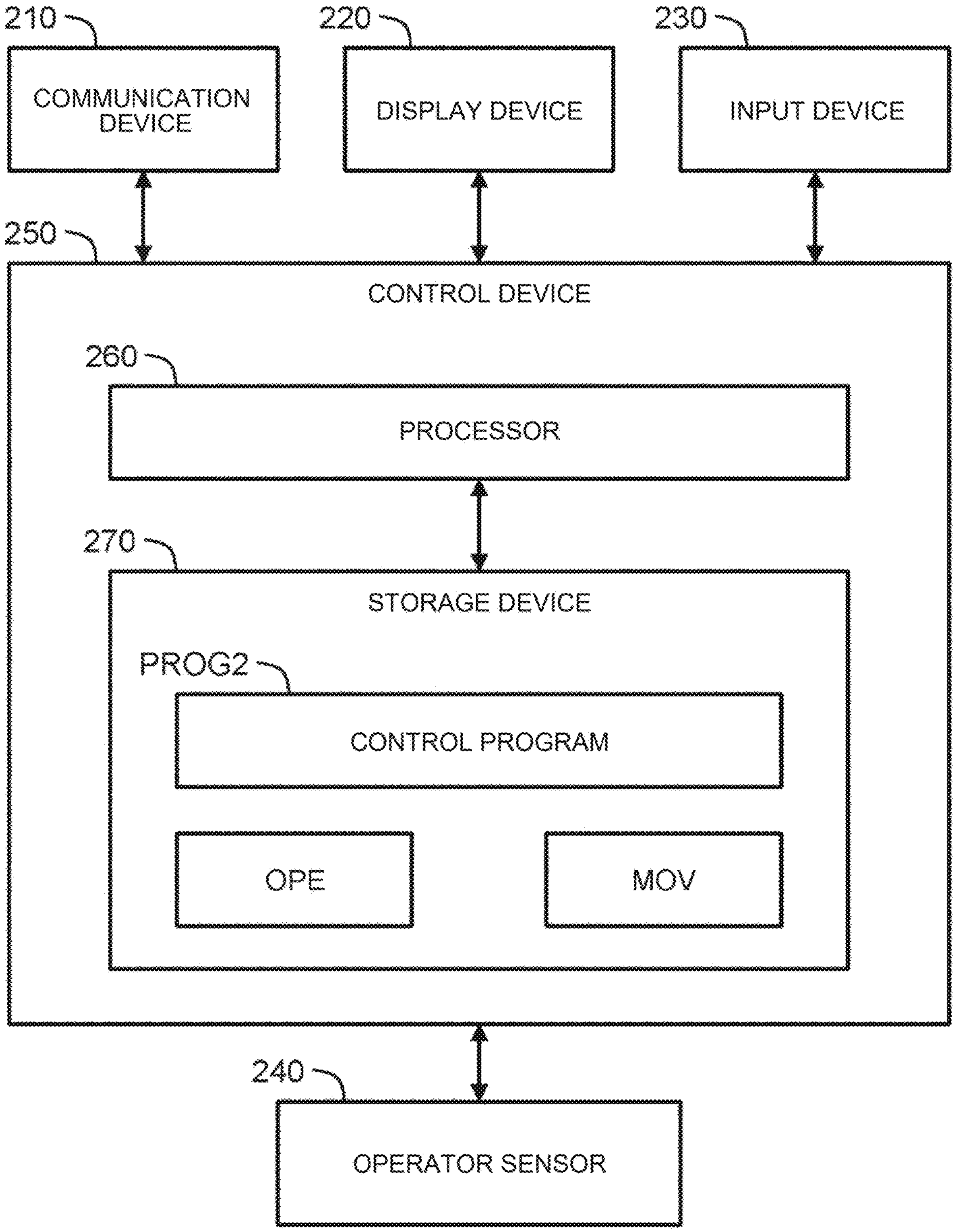
FIG. 5 is a block diagram showing an example of the configuration of a remote operator terminal.

FIG. 5 is a block diagram showing an example of the configuration of the remote operator terminal 200. The remote operator terminal 200 includes a communication device 210, a display device 220, an input device 230, an operator sensor 240, and a control device 250.

The communication device 210 communicates with the mobility 100 and the management system 300.

The display device 220 displays various kinds of information to the remote operator O who performs remote operation. In other words, the display device 220 presents various kinds of information to the remote operator O by displaying them. The display device 220 is typically a display (monitor) such as a liquid crystal display or an organic electroluminescence (EL) display. The display device 220 may be a touch panel.

The input device 230 receives inputs from the remote operator O. For example, the input device 230 includes a remote operation member that the remote operator O operates when remotely operating the mobility 100. Examples of the remote operation member include a steering wheel, an accelerator pedal, a brake pedal, a turn signal lever, a joystick, a directional pad, and a switch. The remote operation member may be a touch panel. The input device 230 may include a member other than the remote operation member, such as a keyboard, a mouse, and a touch panel.

The operator sensor 240 is a sensor for monitoring the state of the remote operator O. For example, the operator sensor 240 includes a biosensor that detects biological information of the remote operator O. Examples of the biological information include body temperature, heart rate, blood pressure, and amount of perspiration.

The control device 250 controls the remote operator terminal 200. The control device 250 includes one or more processors 260 (hereinafter simply referred to as "processor 260") and one or more storage devices 270 (hereinafter simply referred to as "storage device 270"). The processor 260 performs various processes. Examples of the processor 260 include a CPU, a GPU, an ASIC, and an FPGA. Examples of the processor 260 include a general purpose processor, a special purpose processor, a CPU, a GPU, an ASIC, an FPGA, an integrated circuit, a conventional circuit, and/or combinations thereof. The processor 260 can also be referred to as "circuitry" or "processing circuitry." Circuitry is hardware programmed to implement the described functions, or hardware that performs the functions. The storage device 270 stores various kinds of information. Examples of the storage device 270 include a volatile memory, a nonvolatile memory, an HDD, and an SSD.

A control program PROG2 is a computer program that is executed by the processor 260. The functions of the control device 250 may be implemented through cooperation between the processor 260 that executes the control program PROG2 and the storage device 270. The control program PROG2 is stored in the storage device 270. Alternatively, the control program PROG2 may be recorded on a computer-readable recording medium. The control program PROG2 may be provided via a network.

The control device 250 communicates with the mobility 100 via the communication device 210. The control device 250 receives the mobility information MOV sent from the mobility 100. The control device 250 presents the mobility information MOV including the video to the remote operator O by displaying the mobility information MOV on the display device 220. The remote operator O can grasp the state and surroundings of the mobility 100 based on the mobility information MOV displayed on the display device 220.

The remote operator O operates the remote operation member of the input device 230. The amount of operation of the remote operation member is detected by a sensor installed on the remote operation member. The control device 250 generates the remote operation information OPE reflecting the amount of operation of the remote operation member by the remote operator O. The remote operation information OPE can be said to be information reflecting the degree of remote operation by the remote operator O. The control device 250 sends the remote operation information OPE to the mobility 100 via the communication device 210.

2-3. Configuration Example of Management System

Figure 6:
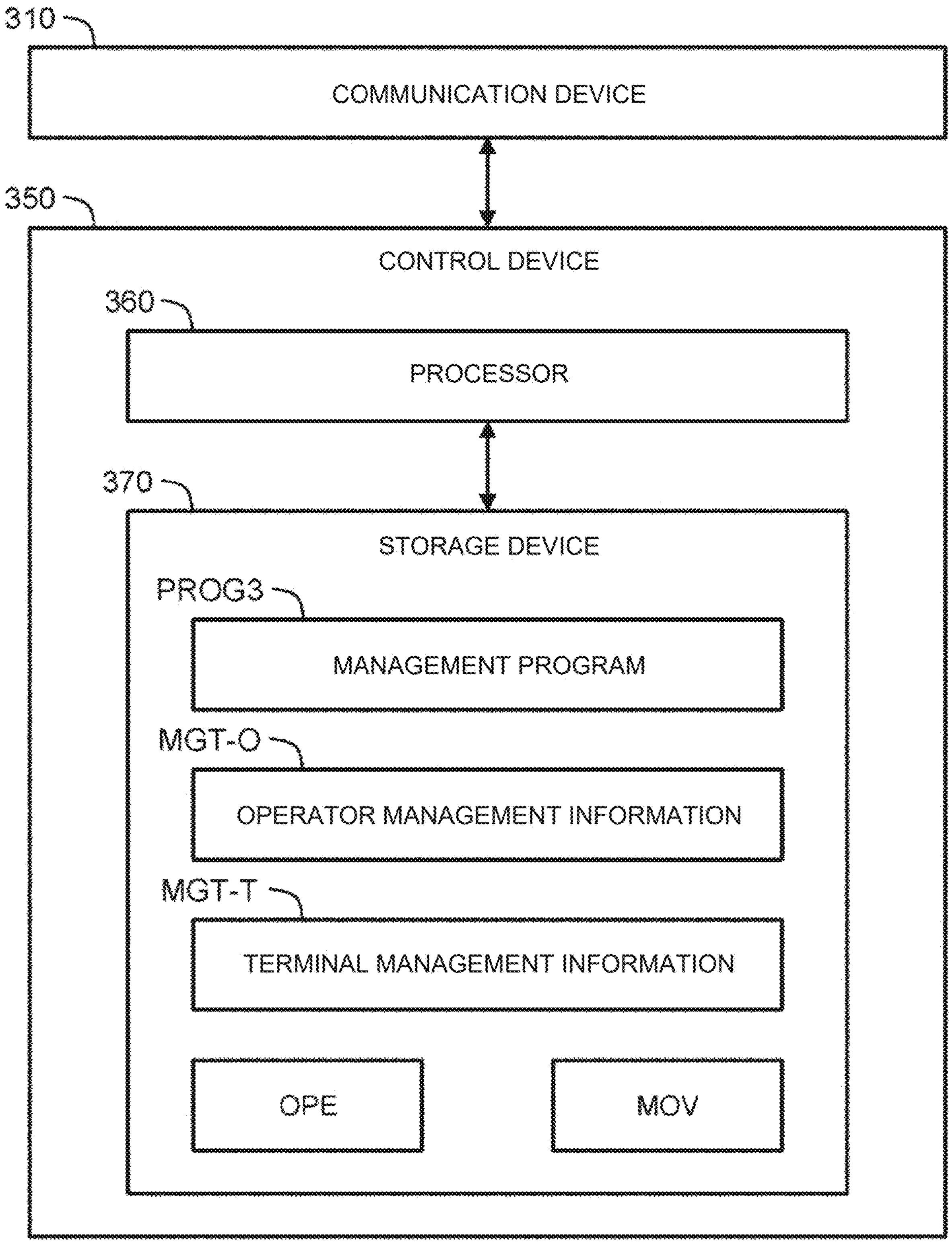
FIG. 6 is a block diagram showing an example of the configuration of a management system.

FIG. 6 is a block diagram showing an example of the configuration of the management system 300. The management system 300 includes a communication device 310 and a control device 350.

The communication device 310 communicates with the mobility 100 and the remote operator terminal 200.

The control device 350 controls the management system 300. The control device 350 includes one or more processors 360 (hereinafter simply referred to as "processor 360") and one or more storage devices 370 (hereinafter simply referred to as "storage device 370"). The processor 360 performs various processes. Examples of the processor 360 include a general purpose processor, a special purpose processor, a CPU, a GPU, an ASIC, an FPGA, an integrated circuit, a conventional circuit, and/or combinations thereof. The processor 360 can also be referred to as "circuitry" or "processing circuitry." Circuitry is hardware programmed to implement the described functions, or hardware that performs the functions. The storage device 370 stores various kinds of information. Examples of the storage device 370 include a volatile memory, a nonvolatile memory, an HDD, and an SSD.

A management program PROG3 is a computer program that is executed by the processor 360. The functions of the control device 350 may be implemented through cooperation between the processor 360 that executes the management program PROG3 and the storage device 370. The management program PROG3 is stored in the storage device 370. Alternatively, the management program PROG3 may be recorded on a computer-readable recording medium. The management program PROG3 may be provided via a network.

The storage device 370 further stores operator management information MGT-O and terminal management information MGT-T. The operator management information MGT-O is information for managing the remote operators O. For example, the operator management information MGT-O indicates information on the individual remote operators O, such as an operator identification (ID), license(s) each remote operator O has, availability, assignment status, and work history. The terminal management information MGT-T is information for managing the remote operator terminals 200. For example, the terminal management information MGT-T indicates information on the individual remote operator terminals 200, such as a terminal ID, specifications, availability, assignment status, and operation history.

The control device 350 communicates with the mobility 100 and the remote operator terminal 200 via the communication device 310. The control device 350 may relay communication between the mobility 100 and the remote operator terminal 200. That is, the control device 350 may relay the mobility information MOV and the remote operation information OPE between the mobility 100 and the remote operator terminal 200.

Before the start of remote operation of the mobility 100, the control device 350 performs an "assignment process" of assigning a suitable remote operator O and a suitable remote operator terminal 200 to remote operation of the mobility 100. The assignment process that is performed by the management system 300 (control device 350) will be described in more detail below.

3. Assignment Process

Figure 7:
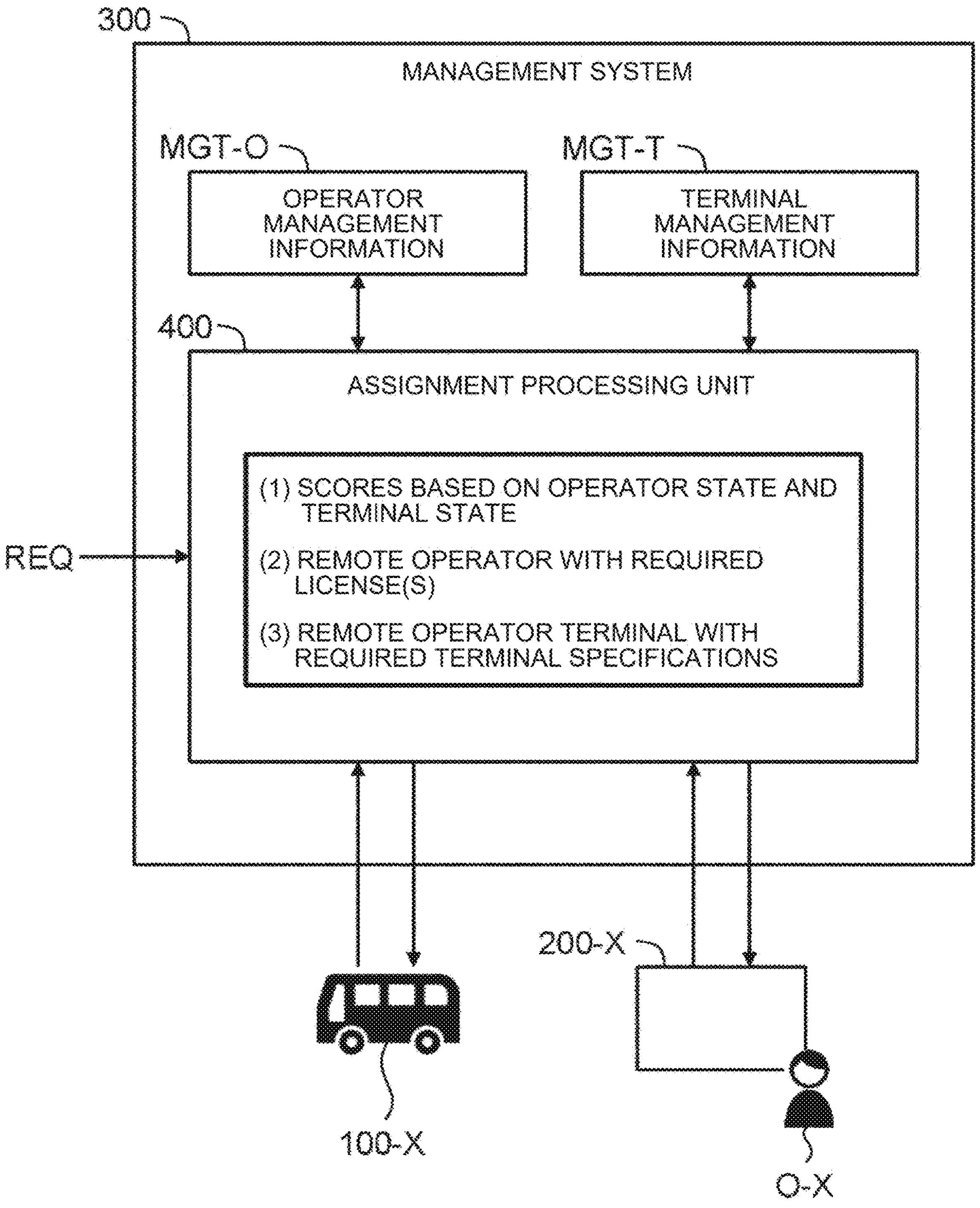
FIG. 7 is a conceptual diagram illustrating an overview of an assignment process that is performed by the management system.

FIG. 7 is a conceptual diagram illustrating an overview of the assignment process that is performed by the management system 300. The mobility 100 to be remotely operated is hereinafter referred to as "target mobility 100-X." The remote operator O who is assigned to remote operation of the target mobility 100-X is hereinafter referred to as "first remote operator O-X." The remote operator terminal 200 that is assigned to remote operation of the target mobility 100-X is hereinafter referred to as "first remote operator terminal 200-X."

The management system 300 (control device 350) includes an assignment processing unit 400 that performs the assignment process. First, the assignment processing unit 400 receives a remote operation request REQ regarding the target mobility 100-X. For example, the remote operation request REQ is made by the target mobility 100-X itself. In this case, the target mobility 100-X sends the remote operation request REQ to the management system 300 via wireless communication. As another example, the remote operation request REQ may be sent from the service provider affiliated with the remote operation system 1 to the management system 300.

The remote operation request REQ indicates the type of the target mobility 100-X and the content of desired remote operation. In response to the received remote operation request REQ, the assignment processing unit 400 assigns a first remote operator O-X and a first remote operator terminal 200-X to remote operation of the target mobility 100-X. More specifically, the assignment processing unit 400 assigns a suitable first remote operator O-X out of the remote operators O to remote operation of the target mobility 100-X, based on the remote operation request REQ and the operator management information MGT-O. The assignment processing unit 400 also assigns a suitable first remote operator terminal 200-X out of the remote operator terminals 200 to remote operation of the target mobility 100-X, based on the remote operation request REQ and the terminal management information MGT-T.

The following three aspects will be considered in order to implement an appropriate assignment process:

- first aspect: the state of each remote operator O and the state of each remote operator terminal 200,
- second aspect: the license(s) each remote operator O has and a required license required for remote operation of the target mobility 100-X, and
- third aspect: terminal specifications of each remote operator terminal 200 and required terminal specifications required for remote operation of the target mobility 100-X.

The assignment processing unit 400 performs the assignment process by taking at least one of the first to third aspects into consideration. The assignment processing unit 400 may perform the assignment process by taking two or more of the first to third aspects into consideration. The first, second, and third aspects will be described in detail below in Sections 4, 5, and 6, respectively.

4. First Aspect: Assignment Process in Consideration of Operator State and Terminal State Regarding the remote operator O, there may be states that are suitable for remote operation and states that are not. If a first remote operator O-X who is in a state not suitable for remote operation is selected, the accuracy of remote operation will decrease. Similarly, regarding the remote operator terminal 200 as well, there may be states that are suitable for remote operation and states that are not. If a first remote operator terminal 200-X that is in a state not suitable for remote operation is used, the accuracy of remote operation will decrease.

Therefore, in the first aspect, the assignment process is performed by taking the state of each remote operator O and the state of each remote operator terminal 200 into consideration. For this purpose, the state of each remote operator O and the state of each remote operator terminal 200 are quantified in the form of a "score." The score is a quantitative parameter indicating suitability for remote operation. For example, the score is calculated in the range of 0 to 100. The higher the score, the higher the suitability for remote operation. Based on the scores, a suitable first remote operator O-X and a suitable first remote operator terminal 200-X are selected and assigned to remote operation of the target mobility 100-X. The first aspect will be described in more detail below.

4-1. Examples of Score

Figures 8, 9:
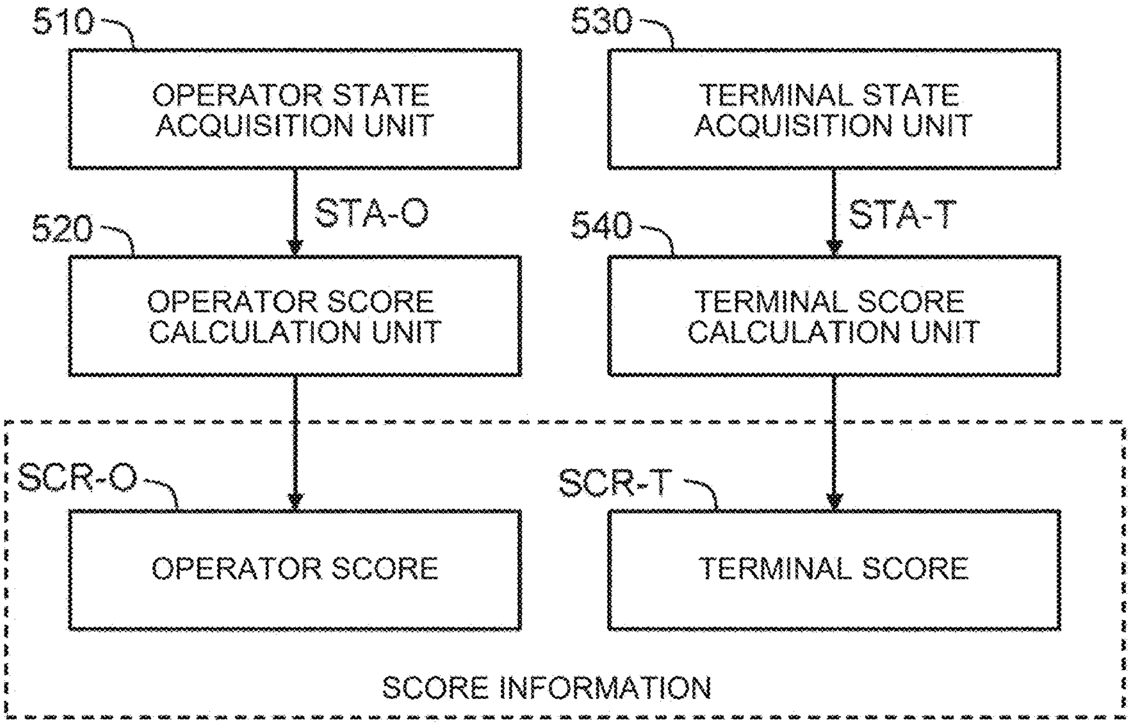
FIG. 8 is a block diagram showing an example of functional configurations related to score calculation.
FIG. 9 is a conceptual diagram showing examples of an operator state and an operator score.

FIG. 8 is a block diagram showing an example of functional configurations related to score calculation.

4-1-1. Examples of Operator Score

An operator state acquisition unit 510 acquires operator state information STA-O indicating the state of the remote operator O. An operator score calculation unit 520 calculates an operator score SCR-O based on the operator state information STA-O. The operator score SCR-O indicates the suitability of the remote operator O for remote operation.

FIG. 9 shows examples of the operator state and the operator score SCR-O.

In a first example, the operator state acquisition unit 510 acquires the health state of the remote operator O. That is, the state of the remote operator O includes the health state of the remote operator O. For example, the remote operator O reports his/her own health state using the remote operator terminal 200 or his/her own terminal (e.g., smartphone). As another example, the operator sensor 240 may be used to detect the health state of the remote operator O. The operator sensor 240 may be included in the remote operator terminal 200 (see FIG. 5), or may be included in the terminal (e.g., smartphone) owned by the remote operator O. The operator sensor 240 includes a biosensor that detects biological information of the remote operator O. Examples of the biological information include body temperature, heart rate, blood pressure, and amount of perspiration. The operator state acquisition unit 510 acquires the biological information detected by the operator sensor 240. The operator state acquisition unit 510 then acquires the health state of the remote operator O based on the biological information of the remote operator O. For example, the health state can be obtained from the biological information using a machine learning model. The operator score calculation unit 520 calculates a first operator score based on the health state of the remote operator O. As shown in FIG. 9, the better the health state of the remote operator O, the higher the first operator score.

In a second example, the operator state acquisition unit 510 acquires the amount of working time the remote operator O was engaged in remote operation over a certain period in the past. That is, the state of the remote operator O includes the amount of working time the remote operator O was engaged in remote operation over a certain period in the past. For example, the amount of working time can be obtained from operation logs recorded in the remote operator terminals 200 that the remote operator O operated in the past. Alternatively, the amount of working time is obtained from the working history of each remote operator O included in the operator management information MGT-O. The operator score calculation unit 520 calculates a second operator score based on the amount of working time of the remote operator O. As shown in FIG. 9, the larger the amount of working time of the remote operator O, the lower the second operator score.

In a third example, the operator state acquisition unit 510 acquires the hourly wage of the remote operator O. That is, the state of the remote operator O includes the hourly wage of the remote operator O. For example, the remote operator O registers his/her own hourly wage using the remote operator terminal 200 or his/her own terminal (e.g., smartphone). The hourly wage of each remote operator O may be registered in advance in the operator management information MGT-O and may be acquired from the operator management information MGT-O. The operator score calculation unit 520 calculates a third operator score based on the hourly wage of the remote operator O. As shown in FIG. 9, the lower the hourly wage of the remote operator O, the higher the third operator score.

Two or more of the above first to third examples may be combined. In that case, the scores in the examples are added up.

Typically, the operator state acquisition unit 510 acquires in real time the operator state information STA-O indicating the state of the remote operator O. The operator score calculation unit 520 calculates the operator score SCR-O in real time based on the operator state information STA-O.

The operator state acquisition unit 510 and the operator score calculation unit 520 may be included in the remote operator terminal 200, may be included in the management system 300, or may be distributed between the remote operator terminal 200 and the management system 300. When the operator state acquisition unit 510 is included in the management system 300, the remote operator terminal 200 sends the biological information, information on the amount of working time, etc. of the remote operator O to the management system 300. When the operator state acquisition unit 510 and the operator score calculation unit 520 are included in the remote operator terminal 200, the remote operator terminal 200 need only send information on the operator score SCR-O to the management system 300. In this case, since there is no need to send the biological information, information on the amount of working time, etc. of the remote operator O to the management system 300, the amount of communication between the remote operator terminal 200 and the management system 300 is reduced. This contributes to reducing communication resources that are used.

4-1-2. Examples of Terminal Score

A terminal state acquisition unit 530 acquires terminal state information STA-T indicating the state of the remote operator terminal 200. A terminal score calculation unit 540 calculates a terminal score SCR-T based on the terminal state information STA-T. The terminal score SCR-T indicates the suitability of the remote operator terminal 200 for remote operation.

FIG. 10 shows examples of the terminal state and the terminal score SCR-T.

In a first example, the terminal state acquisition unit 530 acquires the communication state of the remote operator terminal 200. That is, the state of the remote operator terminal 200 includes the communication state of the remote operator terminal 200. Examples of the communication state include a transmission speed (throughput) and a transmission delay. The remote operator terminal 200 can measure the transmission speed, transmission delay, etc. based on the reception state of data received from a communication partner. As another example, the remote operator terminal 200 measures the transmission speed, transmission delay, etc. based on data the remote operator terminal 200 sent to the communication partner and feedback received from the communication partner. The terminal state acquisition unit 530 acquires the communication state measured by the remote operator terminal 200. The terminal score calculation unit 540 calculates a first terminal score based on the communication state of the remote operator terminal 200. As shown in FIG. 10, the better the communication state of the remote operator terminal 200, the higher the first terminal score.

In a second example, the terminal state acquisition unit 530 acquires the degree of abnormality of the control device 250 (see FIG. 5) of the remote operator terminal 200. That is, the state of the remote operator terminal 200 includes the degree of abnormality of the control device 250 of the remote operator terminal 200. For example, the control device 250 has a self-diagnostic function. The terminal state acquisition unit 530 acquires the self-diagnostic results (normal, alert, abnormal) obtained by the self-diagnostic function of the control device 250. The terminal score calculation unit 540 calculates a second terminal score based on the degree of abnormality of the control device 250 of the remote operator terminal 200. As shown in FIG. 10, the higher the degree of abnormality of the control device 250 of the remote operator terminal 200, the lower the second terminal score.

The above first and second examples may be combined. In that case, the scores in the first and second examples are added up.

Typically, the terminal state acquisition unit 530 acquires in real time the terminal state information STA-T indicating the state of the remote operator terminal 200. The terminal score calculation unit 540 calculates the terminal score SCR-T in real time based on the terminal state information STA-T.

The terminal state acquisition unit 530 and the terminal score calculation unit 540 may be included in the remote operator terminal 200, may be included in the management system 300, or may be distributed between the remote operator terminal 200 and the management system 300. When the terminal state acquisition unit 530 is included in the management system 300, the remote operator terminal 200 sends information on the communication state of the remote operator terminal 200 or the degree of abnormality of the control device 250 to the management system 300. When the terminal state acquisition unit 530 and the terminal score calculation unit 540 are included in the remote operator terminal 200, the remote operator terminal 200 need only send information on the terminal score SCR-T to the management system 300. In this case, since there is no need to send the communication state of the remote operator terminal 200 or the degree of abnormality of the control device 250 to the management system 300, the amount of communication between the remote operator terminal 200 and the management system 300 is reduced. This contributes to reducing communication resources that are used.

4-1-3. Integrated Score

Figure 11:
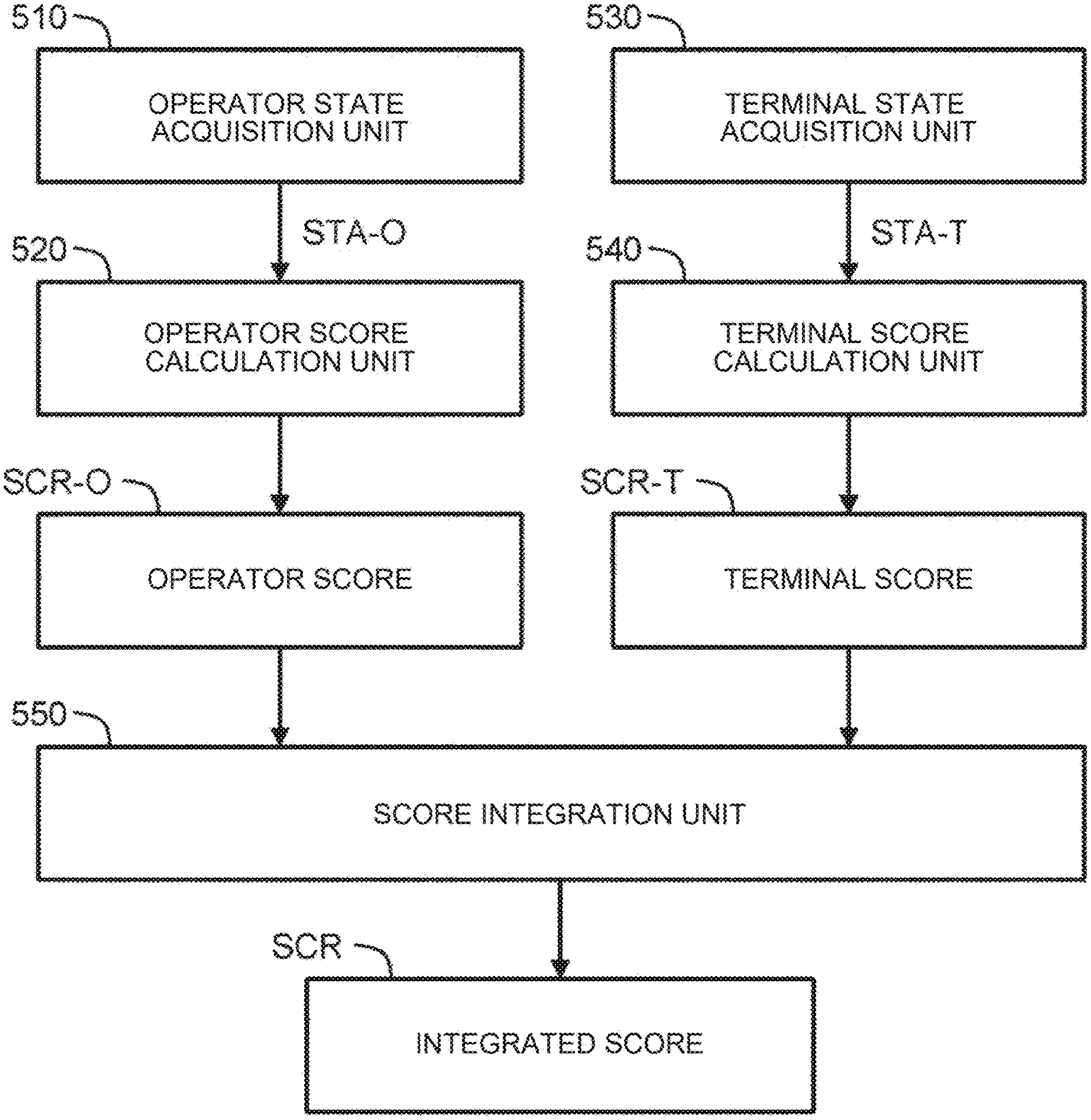
FIG. 11 is a block diagram showing another example of the functional configurations related to score calculation.

FIG. 11 is a block diagram showing another example of the functional configurations related to score calculation. A score integration unit 550 calculates an integrated score SCR by integrating the operator score SCR-O and the terminal score SCR-T. That is, the integrated score SCR reflects the operator score SCR-O and the terminal score SCR-T. The integrated score SCR indicates the suitability of the combination of the remote operator O and the remote operator terminal 200 for remote operation. The higher the integrated score SCR, the higher the suitability.

For example, the score integration unit 550 calculates the average value of the operator score SCR-O and the terminal score SCR-T. When the average value is less than 100, the average value is used as the integrated score SCR. When the average value is 100 or more, the integrated score SCR is always set to 100.

The score integration unit 550 may be included in the remote operator terminal 200, or may be included in the management system 300. The operator state acquisition unit 510, the operator score calculation unit 520, the terminal state acquisition unit 530, the terminal score calculation unit 540, and the score integration unit 550 may all be included in the remote operator terminal 200. In this case, the remote operator terminal 200 need only send information on the integrated score SCR to the management system 300. Therefore, the amount of communication between the remote operator terminal 200 and the management system 300 is reduced. This contributes to reducing communication resources that are used.

4-2. Assignment Process

Figure 12:
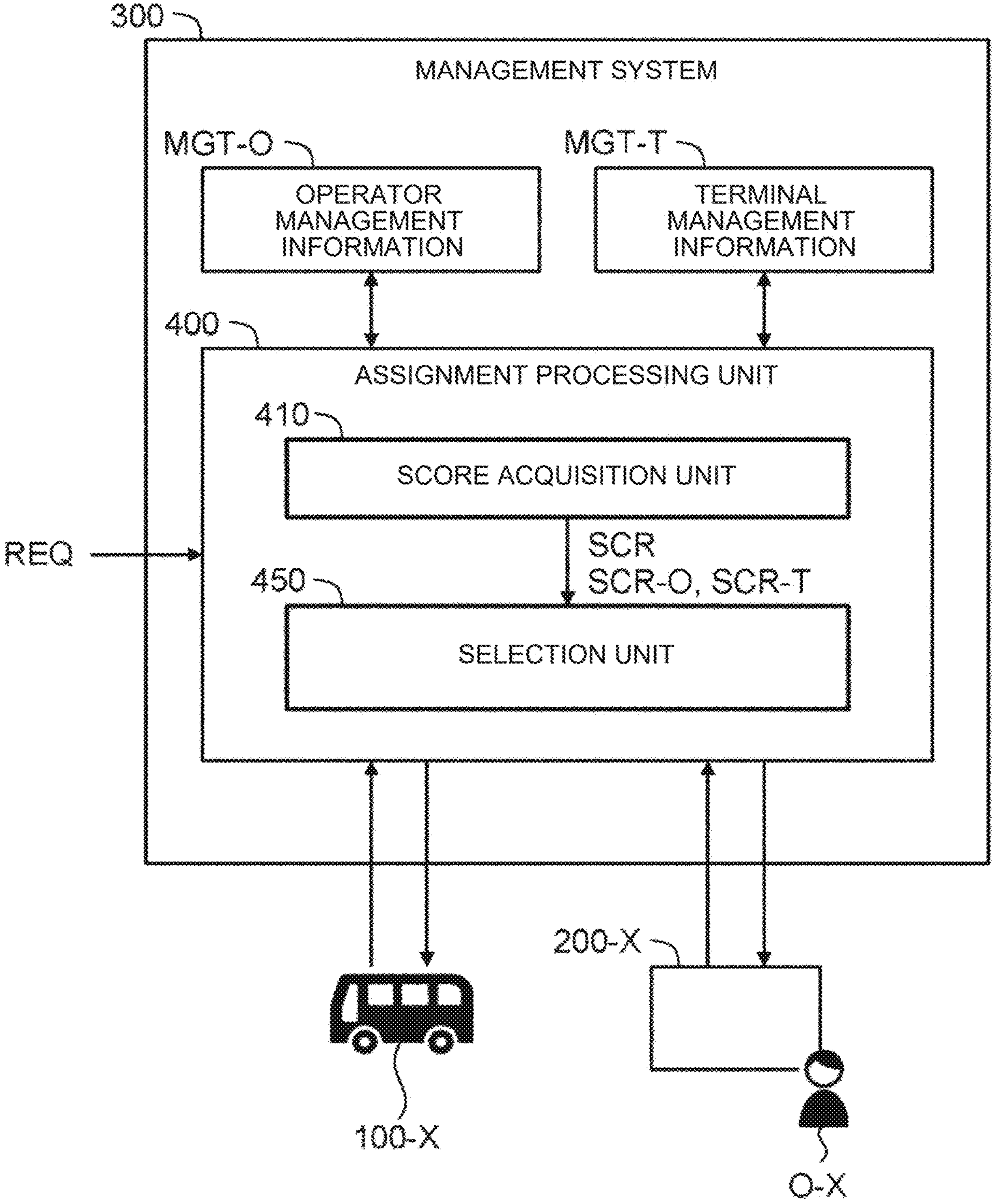
FIG. 12 is a block diagram showing an example of functional configurations related to the assignment process in a first aspect.

FIG. 12 is a block diagram showing an example of functional configurations related to the assignment process in the first aspect. The assignment processing unit 400 of the management system 300 includes a score acquisition unit 410 and a selection unit 450.

The score acquisition unit 410 acquires the operator scores SCR-O from the operator score calculation unit 520. More specifically, the score acquisition unit 410 acquires the operator scores SCR-O of the individual remote operators O indicated by the operator management information MGT-O. The score acquisition unit 410 may register the operator scores SCR-O of the individual remote operators O in the operator management information MGT-O. Typically, the score acquisition unit 410 acquires the operator scores SCR-O of the individual remote operators O in real time.

The selection unit 450 selects a suitable first remote operator O-X from the remote operators O, based on the operator scores SCR-O and the operator management information MGT-O. More specifically, the selection unit 450 extracts any available (free) remote operators O from the remote operators O, based on the operator management information MGT-O. The selection unit 450 then selects a first remote operator O-X from the available remote operators O, based on the operator scores SCR-O. For example, the selection unit 450 preferentially selects a remote operator O with a high operator score SCR-O as a first remote operator O-X. That is, the operator scores SCR-O are used to determine operator priority. When there is a plurality of candidates with the same operator score SCR-O, the selection unit 450 may preferentially select a remote operator O with a longer waiting time as a first remote operator O-X. The selected first remote operator O-X is assigned to remote operation of the target mobility 100-X.

The score acquisition unit 410 acquires the terminal scores SCR-T from the terminal score calculation unit 540. More specifically, the score acquisition unit 410 acquires the terminal scores SCR-T of the individual remote operator terminals 200 indicated by the terminal management information MGT-T. The score acquisition unit 410 may register the terminal scores SCR-T of the individual remote operator terminals 200 in the terminal management information MGT-T. Typically, the score acquisition unit 410 acquires the terminal scores SCR-T of the individual remote operator terminals 200 in real time.

The selection unit 450 selects a suitable first remote operator terminal 200-X from the remote operator terminals 200, based on the terminal scores SCR-T and the terminal management information MGT-T. More specifically, the selection unit 450 extracts any available (ready for use) remote operator terminals 200 from the remote operator terminals 200, based on the terminal management information MGT-T. The selection unit 450 then selects a first remote operator terminal 200-X from the available remote operator terminals 200, based on the terminal scores SCR-T. For example, the selection unit 450 preferentially selects a remote operator terminal 200 with a high terminal score SCR-T as a first remote operator terminal 200-X. That is, the terminal scores SCR-T are used to determine terminal priority. When there is a plurality of candidates with the same terminal score SCR-T, the selection unit 450 may preferentially select a remote operator terminal 200 with a longer waiting time as a first remote operator terminal 200-X. The selected first remote operator terminal 200-X is assigned to remote operation of the target mobility 100-X.

Alternatively, in the example shown in FIG. 11, the score acquisition unit 410 acquires the integrated scores SCR from the score integration unit 550. More specifically, the score acquisition unit 410 acquires the integrated scores SCR of a plurality of combinations of the remote operators O and the remote operator terminals 200. Typically, the score acquisition unit 410 acquires the integrated scores SCR of the individual combinations of the remote operators O and the remote operator terminals 200 in real time.

The selection unit 450 selects a suitable combination of a first remote operator O-X and a first remote operator terminal 200-X from the combinations, based on the integrated scores SCR, the operator management information MGT-O, and the terminal management information MGT-T. More specifically, the selection unit 450 extracts any available (free) remote operators O from the remote operators O, based on the operator management information MGT-O. The selection unit 450 extracts any available (ready for use) remote operator terminals 200 from the remote operator terminals 200, based on the terminal management information MGT-T. The selection unit 450 then selects a first remote operator O-X from the available remote operators O and selects a first remote operator terminal 200-X from the available remote operator terminals 200, based on the integrated scores SCR. For example, the selection unit 450 preferentially selects a combination of a remote operator O and a remote operator terminal 200 with a high integrated score SCR as a combination of a first remote operator O-X and a first remote operator terminal 200-X. That is, the integrated scores SCR are used to determine priority. When there is a plurality of candidates with the same integrated score SCR, the selection unit 450 may preferentially select a combination including a remote operator O with a longer waiting time. The selected combination of the first remote operator O-X and the first remote operator terminal 200-X is assigned to remote operation of the target mobility 100-X.

4-3. Effects

As described above, according to the first aspect, the operator scores SCR-O indicating the suitability of the individual remote operators O for remote operation are calculated based on the states of the individual remote operators O. A first remote operator O-X to be assigned to remote operation of the target mobility 100-X is selected based on the operator scores SCR-O. That is, a suitable first remote operator O-X is assigned to remote operation of the target mobility 100-X by taking the suitability into consideration. This ensures the accuracy of remote operation of the target mobility 100-X.

The terminal scores SCR-T indicating the suitability of the individual remote operator terminals 200 for remote operation are also calculated based on the states of the individual remote operator terminals 200. A first remote operator terminal 200-X to be assigned to remote operation of the target mobility 100-X is selected based on the terminal scores SCR-T. That is, a suitable first remote operator terminal 200-X is assigned to remote operation of the target mobility 100-X by taking the suitability into consideration. This ensures the accuracy of remote operation of the target mobility 100-X.

The score calculation may be performed by each remote operator terminal 200. In this case, the remote operator terminal 200 need only send score information to the management system 300. Therefore, the amount of communication between the remote operator terminal 200 and the management system 300 is reduced. This contributes to reducing communication resources that are used.

5. Second Aspect: Assignment Process in Consideration of Operator Licenses

It is herein assumed that there is a plurality of types of mobilities 100 for remote operation (see FIG. 2). Remote operators O do not necessarily have licenses (certifications, qualifications) for all types of mobilities 100. If a remote operator O who does not have a license to operate the target mobility 100-X is assigned to remote operation of the target mobility 100-X by mistake, the assignment process must be started over, which is inefficient.

Therefore, in the second aspect, the assignment process is performed by taking the license(s) each remote operator O has into consideration. More specifically, a first remote operator O-X having the license required for remote operation of the target mobility 100-X is assigned to remote operation of the target mobility 100-X. The second aspect will be described in more detail below.

5-1. Operator License Information

FIG. 13 shows an example of operator license information LIC. The operator license information LIC indicates the licenses (certifications, qualifications) the individual remote operators O have for operation (driving) of the plurality of types of mobilities 100. In other words, the operator license information LIC indicates the license(s) each remote operator O has. The license for a certain mobility 100 officially authorizes operation of that mobility 100. Each remote operator O has a license(s) for one or more types of mobilities 100. A single remote operator O may have licenses for two or more types of mobilities 100. Every remote operator O may have different licenses.

The operator license information LIC is included in the operator management information MGT-O. For example, each remote operator O reports the license(s) he/she has using the remote operator terminal 200 or his/her own terminal. The management system 300 collects information on the licenses the individual remote operators O have to generate the operator license information LIC in advance and update the operator license information LIC as needed.

5-2. Assignment Process

Figure 14:
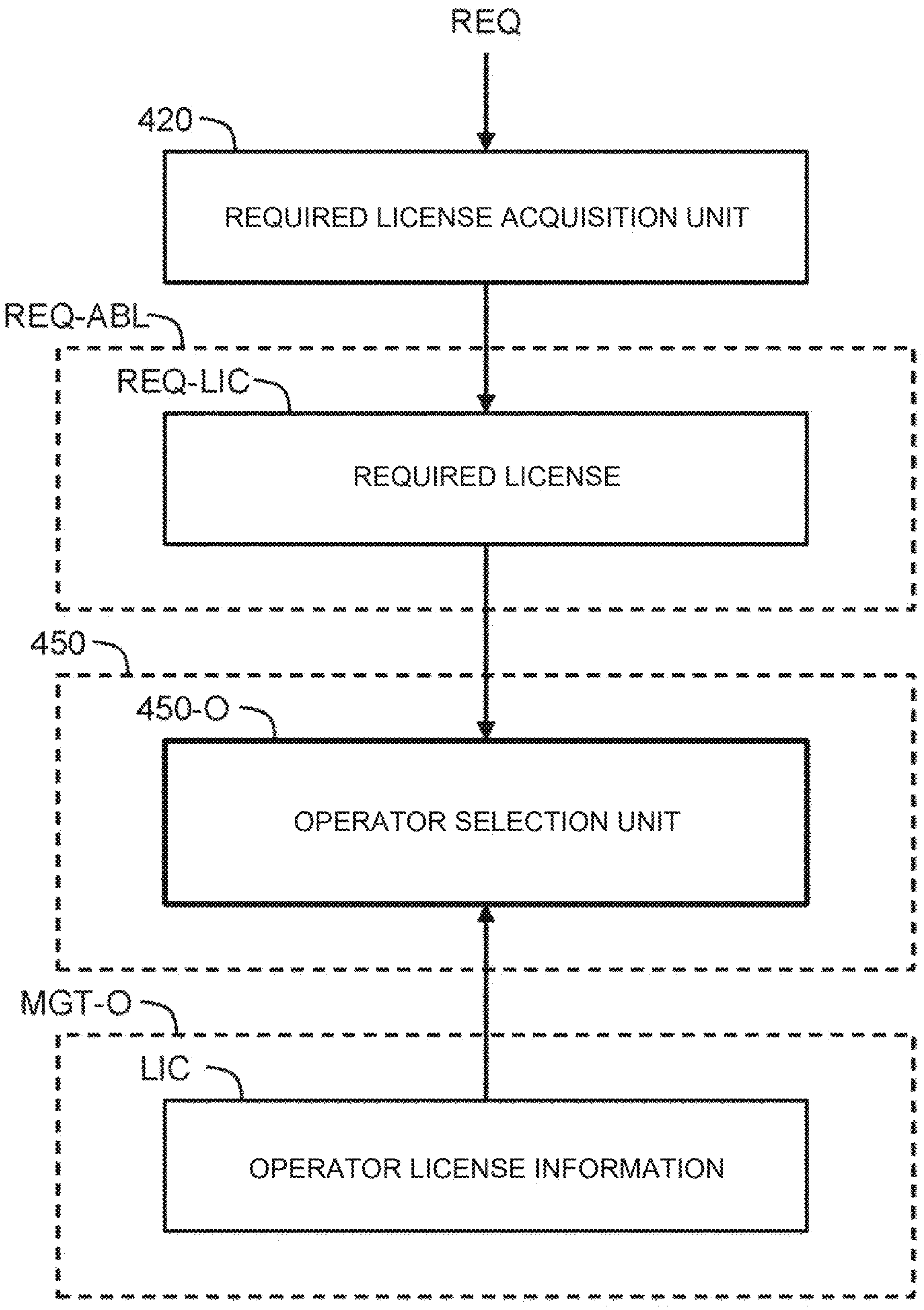
FIG. 14 is a block diagram showing an example of functional configurations related to the assignment process in a second aspect.

FIG. 14 is a block diagram showing an example of functional configurations related to the assignment process in the second aspect. The assignment processing unit 400 of the management system 300 includes a required license acquisition unit 420 and the selection unit 450.

The required license acquisition unit 420 receives a remote operation request REQ. The remote operation request REQ indicates the type of the target mobility 100-X. The required license acquisition unit 420 can recognize a "required license REQ-LIC" required for remote operation of the target mobility 100-X, based on the type of the target mobility 100-X.

Required capability information REQ-ABL indicates the capabilities required for remote operation of the target mobility 100-X. The required capability information REQ-ABL includes at least information of the required license REQ-LIC.

The selection unit 450 includes an operator selection unit 450-O. The operator selection unit 450-O selects a suitable first remote operator O-X from the remote operators O, based on the operator management information MGT-O and the required capability information REQ-ABL. More specifically, the operator selection unit 450-O extracts any available (free) remote operators O from the remote operators O, based on the operator management information MGT-O. The operator selection unit 450-O also acquires the operator license information LIC included in the operator management information MGT-O, and the information on the required license REQ-LIC included in the required capability information REQ-ABL. The operator selection unit 450-O then selects a first remote operator O-X having the required license REQ-LIC from the available remote operators O, based on the operator license information LIC and the required license REQ-LIC. The selected first remote operator O-X is assigned to remote operation of the target mobility 100-X.

When there is a plurality of remote operators O who has the required license REQ-LIC, the operator selection unit 450-O may select a first remote operator O-X by taking the operator scores SCR-O described above in Section 4 into consideration. More specifically, the operator selection unit 450-O may preferentially select a remote operator O with a high operator score SCR-O as a first remote operator O-X. When there is a plurality of candidates with the same operator score SCR-O, the operator selection unit 450-O may preferentially select a remote operator O with a longer waiting time as a first remote operator O-X.

As another example, when there is a plurality of remote operators O who has the required license REQ-LIC, the operator selection unit 450-O may select a remote operator O having the fewest types of licenses as a first remote operator O-X for this time. In this case, the remote operators O having licenses for more types of mobilities 100 are saved for later. This increases the probability that a suitable remote operator O can be assigned to the subsequent target mobility 100-X for which remote operation is requested.

5-3. Effects

As described above, according to the second aspect, the licenses the individual remote operators O have and the required license REQ-LIC required for remote operation of the target mobility 100-X are considered. A first remote operator O-X having the required license REQ-LIC is assigned to remote operation of the target mobility 100-X. This ensures the accuracy of remote operation of the target mobility 100-X. Moreover, this avoids a situation in which a remote operator O who does not have the required license REQ-LIC is assigned to the target mobility 100-X by mistake. This eliminates the need to start over the assignment process, and implements an efficient assignment process.

6. Third Aspect: Assignment Process in Consideration of Terminal Specifications

The specifications required for a remote operator terminal 200 may vary depending on the type of the target mobility 100-X. The specifications required for a remote operator terminal 200 may also vary depending on the content of the requested remote operation. If a remote operator terminal 200 that does not meet the specifications required for remote operation of the target mobility 100-X is assigned to remote operation of the target mobility 100-X, the accuracy of remote operation will decrease. Moreover, it is inefficient to start over the assignment process.

Therefore, in the third aspect, the assignment process is performed by taking the specifications of each remote operator terminal 200 into consideration. More specifically, a first remote operator terminal 200-X that meets the required terminal specifications required for remote operation of the target mobility 100-X is assigned to remote operation of the target mobility 100-X. The third aspect will be described in more detail below.

6-1. First Example

FIG. 15 shows an example of terminal specification information SPC. The terminal specification information SPC indicates the specifications of the individual remote operator terminals 200. In the example shown in FIG. 15, the terminal specification information SPC indicates the types of the individual remote operator terminals 200, the types of mobilities 100 supported by the individual remote operator terminals 200, and the content of remote operations (services) supported by the individual remote operator terminals 200.

Examples of the types of remote operator terminals 200 include a cockpit-type terminal, a personal computer (PC), a tablet, and a smartphone. If the type of remote operator terminal 200 changes, the type(s) of mobility (ies) 100 supported by the remote operator terminal 200 and the content of remote operation(s) supported by the remote operator terminal 200 also change. For example, cockpit-type terminals are suitable for remote operation of various types of vehicles, and are also suitable for driving on public roads and long distance driving. Tablets are not necessarily suitable for driving on public roads or long distance driving. Tablets can be used for driving a vehicle a short distance in a limited area such as a parking lot, for automated driving assist such as pulling over to a road shoulder in case of emergency, for remote operation of a small vehicle in a factory, etc.

The terminal specification information SPC is included in the terminal management information MGT-T. For example, the management system 300 collects information on the type of remote operator terminal from each of the remote operator terminals 200. The management system 300 generates in advance the terminal specification information SPC illustrated in FIG. 15, and updates the terminal specification information SPC as needed, based on the types of the individual remote operator terminals 200.

Figure 16:
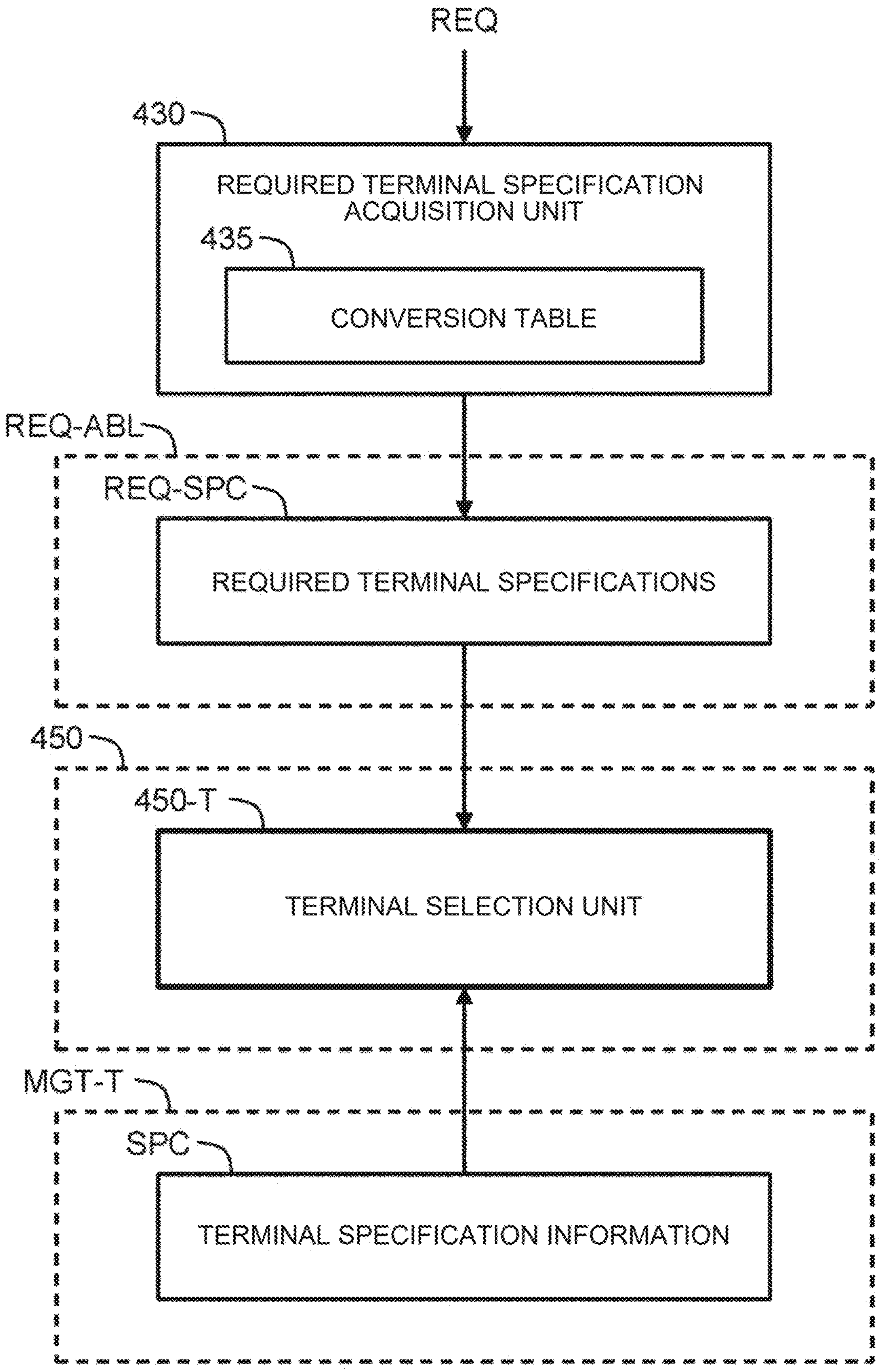
FIG. 16 is a block diagram showing an example of functional configurations related to the assignment process in a third aspect.

FIG. 16 is a block diagram showing an example of functional configurations related to the assignment process in the third aspect. The assignment processing unit 400 of the management system 300 includes a required terminal specification acquisition unit 430 and the selection unit 450.

The required terminal specification acquisition unit 430 receives a remote operation request REQ. The remote operation request REQ indicates either or both of the "type of the target mobility 100-X" and the "content of desired remote operation of the target mobility 100-X." The required terminal specification acquisition unit 430 can recognize "required terminal specifications REQ-SPE" required for remote operation of the target mobility 100-X, based on the remote operation request REQ. In this example, the remote operation request REQ is used as it is as the required terminal specifications REQ-SPC.

Required capability information REQ-ABL indicates the capabilities required for remote operation of the target mobility 100-X. The required capability information REQ-ABL includes at least information on the required terminal specifications REQ-SPC.

The selection unit 450 includes a terminal selection unit 450-T. The terminal selection unit 450-T selects a suitable first remote operator terminal 200-X from the remote operator terminals 200, based on the terminal management information MGT-T and the required capability information REQ-ABL. More specifically, the terminal selection unit 450-T extracts any available (ready for use) remote operator terminals 200 from the remote operator terminals 200, based on the terminal management information MGT-T. The terminal selection unit 450-T acquires the terminal specification information SPC contained in the terminal management information MGT-T, and the information on the required terminal specifications REQ-SPC included in the required capability information REQ-ABL. The terminal selection unit 450-T then selects a first remote operator terminal 200-X that meets the required terminal specifications REQ-SPC from the available remote operator terminals 200, based on the terminal specification information SPC and the required terminal specifications REQ-SPC. The selected first remote operator terminal 200-X is assigned to remote operation of the target mobility 100-X.

When there is a plurality of remote operator terminals 200 that meets the required terminal specifications REQ-SPC, the terminal selection unit 450-T may select a first remote operator terminal 200-X by taking the terminal scores SCR-T described above in Section 4 into consideration. More specifically, the terminal selection unit 450-T may preferentially select a remote operator terminal 200 with a high terminal score SCR-T as a first remote operator terminal 200-X. When there is a plurality of candidates with the same terminal score SCR-T, the terminal selection unit 450-T may preferentially select a remote operator terminal 200 with a longer waiting time as a first remote operator terminal 200-X.

6-2. Second Example

Dedicated remote operator terminals 200 (remote cockpits) may be prepared for the individual types of mobilities 100. However, it is preferable from the standpoints of cost reduction, reduction in installation area, efficiency, convenience, etc if various types of mobilities 100 can be remotely operated by a single remote operator terminal 200. A second example considers the case where various types of mobilities 100 are remotely operated by a single remote operator terminal 200. For this purpose, the specifications (equipment) of the remote operator terminals 200 are redefined in a more abstract way. More specifically, as will be described below, the specifications (equipment) of the remote operator terminals 200 are defined by "operation system capabilities" and "display system capabilities." The same description as in the first example will be omitted as appropriate.

6-2-1. Operation System Capabilities

The input device 230 (see FIG. 5) of each remote operator terminal 200 includes a remote operation member that the remote operator O operates when remotely operating the mobility 100. Examples of the remote operation member include a steering wheel, an accelerator pedal, a brake pedal, a joystick, a directional pad, and a touch panel. Although the individual remote operation members have different physical structures, their usage is the same. That is, the remote operation members are used to perform a forward and reverse operation and lateral operation of the target mobility 100-X. Therefore, another remote operation member can be substituted for one remote operation member.

For example, forward, reverse, and lateral operations of a joystick are associated with an accelerator pedal operation, a brake pedal operation, and a steering wheel operation, respectively. As another example, the operation systems of various types of mobilities 100 can be replicated by a user interface displayed on a touch panel. In any case, it is possible to convert the amount of operation of one remote operation member to the amount of operation of another remote operation member. Therefore, another remote operation member can be substituted for one remote operation member.

The operation system capabilities of the remote operator terminals 200 are defined in view of the above. Specifically, the operation system capabilities of the remote operator terminals 200 include the "number of inputs for a forward and reverse operation of the mobility 100" and the "number of inputs for a lateral operation of the mobility 100." The operation system capabilities of the remote operator terminals 200 may further include "presence or absence of operation feedback." The presence or absence of operation feedback means whether the remote operator terminal 200 includes an operation reaction force mechanism that can generate an operation reaction force to the remote operator O.

FIG. 17 shows an example of the terminal specification information SPC and required terminal specifications REQ-SPC related to the operation system. As shown in FIG. 17, the terminal specification information SPC includes operation system information indicating the operation system capabilities of the individual remote operator terminals 200. For example, the number of forward and reverse operation inputs of a remote operator terminal 200 equipped with an accelerator pedal and a brake pedal is "2." As another example, the number of forward and reverse operation inputs of a remote operator terminal 200 equipped with a joystick is "2." In the case of a tablet capable of displaying a desired user interface on a touch panel, the operation system capabilities can be set as desired.

The required terminal specifications REQ-SPC include the operation system capabilities required for remote operation of the target mobility 100-X. As shown in FIG. 17, if the type of the target mobility 100-X (e.g., vehicle, watercraft, or construction machine) changes, the required operation system capabilities also change. Even when the type of the target mobility 100-X is the same, the required operation system capabilities may be different depending on the content of desired remote operation (e.g., long distance driving, or pulling over to the road shoulder).

The required terminal specification acquisition unit 430 receives a remote operation request REQ. The remote operation request REQ indicates either or both of the "type of the target mobility 100-X" and the "content of desired remote operation of the target mobility 100-X." The required terminal specification acquisition unit 430 can recognize required terminal specifications REQ-SPE including the operation system capabilities required for remote operation of the target mobility 100-X, based on the remote operation request REQ.

For example, a conversion table 435 showing correspondence between remote operation requests REQ and required terminal specifications REQ-SPC is prepared in advance (see FIG. 16). The conversion table 435 is stored in advance in the storage device 370 of the management system 300. The required terminal specification acquisition unit 430 can recognize the required terminal specifications REQ-SPC corresponding to the received remote operation request REQ by referring to the conversion table 435.

The terminal selection unit 450-T acquires the terminal specification information SPC and the information on the required terminal specifications REQ-SPC. The terminal selection unit 450-T then selects a first remote operator terminal 200-X that meets the required terminal specifications REQ-SPC from the available remote operator terminals 200, based on the terminal specification information SPC and the required terminal specifications REQ-SPC. More specifically, the terminal selection unit 450-T selects a first remote operator terminal 200-X that has at least the required operation system capabilities, based on the terminal specification information SPC (operation system information) and the required terminal specifications REQ-SPC. The selected first remote operator terminal 200-X is assigned to remote operation of the target mobility 100-X.

When there is a plurality of remote operator terminals 200 that has the required operation system capabilities, the terminal selection unit 450-T may select a first remote operator terminal 200-X by taking the terminal scores SCR-T described above in Section 4 into consideration. More specifically, the terminal selection unit 450-T may preferentially select a remote operator terminal 200 with a high terminal score SCR-T as a first remote operator terminal 200-X. When there is a plurality of candidates with the same terminal score SCR-T, the terminal selection unit 450-T may preferentially select a remote operator terminal 200 with a longer waiting time as a first remote operator terminal 200-X.

As another example, when there is a plurality of remote operator terminals 200 that meets the required operation system capabilities, the terminal selection unit 450-T may select a remote operator terminal 200 having minimum operation system capabilities as a first remote operator terminal 200-X for this time. In this case, the remote operator terminals 200 having higher operation system capabilities are saved for later. This increases the probability that a suitable remote operator terminal 200 can be assigned even when high operation system capabilities are required for remote operation of the subsequent target mobility 100-X.

As a modification, under a specific situation, the terminal selection unit 450-T may select a remote operator terminal 200 that falls slightly short of the required operation system capabilities as a first remote operator terminal 200-X. The specific situation may be when there is no other option in case of emergency. For example, even when a remote operator terminal 200 with operation feedback is preferred, a remote operator terminal 200 with no operation feedback may be selected as a first remote operator terminal 200-X in case of emergency. In this case, however, the terminal selection unit 450-T instructs the target mobility 100-X and the first remote operator terminal 200-X to restrict functions. Examples of the restriction on the functions include lowering the upper speed limit to a limit value lower than a default value, and narrowing the steering range to a limit range narrower than a default range. Instructions to the target mobility 100-X and the first remote operator terminal 200-X are given through communication.

6-2-2. Display System Capabilities

There are various types of display devices 220 (see FIG. 5) of the remote operator terminals 200. For example, the number of monitors included in the display device 220 may vary depending on the remote operator terminal 200. Resolution (size) also varies depending on the monitor. A monitor with high resolution (size) can simultaneously display a plurality of types of videos on one monitor. When the control device 250 of the remote operator terminal 200 has a picture-in-picture function, it is also possible to embed one video in another video. The display system capabilities of the remote operator terminals 200 are defined in view of the above. Specifically, the display system capabilities of the remote operator terminals 200 include the "number of monitors" and the "number of videos that can be displayed simultaneously."

FIG. 18 shows an example of the terminal specification information SPC and required terminal specifications REQ-SPC related to the display system. As shown in FIG. 18, the terminal specification information SPC includes display system information indicating the display system capabilities of the individual remote operator terminals 200.

The required terminal specifications REQ-SPC include the display system capabilities required for remote operation of the target mobility 100-X. As shown in FIG. 18, if the type of the target mobility 100-X (e.g., vehicle or construction machine) changes, the required display system capabilities also change. Even when the type of the target mobility 100-X is the same, the required display system capabilities may be different depending on the content of desired remote operation (e.g., driving or parking).

The required terminal specification acquisition unit 430 receives a remote operation request REQ. The remote operation request REQ indicates either or both of the "type of the target mobility 100-X" and the "content of desired remote operation of the target mobility 100-X." The required terminal specification acquisition unit 430 can recognize required terminal specifications REQ-SPE including the display system capabilities required for remote operation of the target mobility 100-X, based on the remote operation request REQ.

For example, the conversion table 435 showing correspondence between remote operation requests REQ and required terminal specifications REQ-SPC is prepared in advance (see FIG. 16). The conversion table 435 is stored in advance in the storage device 370 of the management system 300. The required terminal specification acquisition unit 430 can recognize the required terminal specifications REQ-SPC corresponding to the received remote operation request REQ by referring to the conversion table 435.

The terminal selection unit 450-T acquires the terminal specification information SPC and the information on the required terminal specifications REQ-SPC. The terminal selection unit 450-T then selects a first remote operator terminal 200-X that meets the required terminal specifications REQ-SPC from the available remote operator terminals 200, based on the terminal specification information SPC and the required terminal specifications REQ-SPC. More specifically, the terminal selection unit 450-T selects a first remote operator terminal 200-X that has at least the required display system capabilities, based on the terminal specification information SPC (display system information) and the required terminal specifications REQ-SPC. The selected first remote operator terminal 200-X is assigned to remote operation of the target mobility 100-X.

When there is a plurality of remote operator terminals 200 that has the required display system capabilities, the terminal selection unit 450-T may select a first remote operator terminal 200-X by taking the terminal scores SCR-T described above in Section 4 into consideration. More specifically, the terminal selection unit 450-T may preferentially select a remote operator terminal 200 with a high terminal score SCR-T as a first remote operator terminal 200-X. When there is a plurality of candidates with the same terminal score SCR-T, the terminal selection unit 450-T may preferentially select a remote operator terminal 200 with a longer waiting time as a first remote operator terminal 200-X.

As another example, when there is a plurality of remote operator terminals 200 that meets the required display system capabilities, the terminal selection unit 450-T may select a remote operator terminal 200 having minimum display system capabilities as a first remote operator terminal 200-X for this time. In this case, the remote operator terminals 200 having higher display system capabilities are saved for later. This increases the probability that a suitable remote operator terminal 200 can be assigned even when high display system capabilities are required for remote operation of the subsequent target mobility 100-X.

As a modification, under a specific situation, the terminal selection unit 450-T may select a remote operator terminal 200 that falls slightly short of the required display system capabilities as a first remote operator terminal 200-X. The specific situation may be when there is no other option in case of emergency. For example, even when two types of auxiliary videos are preferred to be displayed in addition to three types of necessary videos, a remote operator terminal 200 that can display only three types of videos may be selected as a first remote operator terminal 200-X in case of emergency. In this case, however, the terminal selection unit 450-T instructs the target mobility 100-X and the first remote operator terminal 200-X to restrict functions. Examples of the restriction on the functions include lowering the upper speed limit to a limit value lower than a default value, and narrowing the steering range to a limit range narrower than a default range. Instructions to the target mobility 100-X and the first remote operator terminal 200-X are given through communication.

The remote operator O can customize the video display mode as desired according to the content of the remote operation request REQ. The video display mode includes layout, a video display position, a video size, and whether to display a video(s). The remote operator O can set whether to display an auxiliary image(s) as desired. The auxiliary images include lane markings, a trajectory line, a line representing a maximum turning radius, and a safe stopping position.

6-3. Effects

As described above, according to the third aspect, the specifications of the individual remote operator terminals 200 and the required terminal specifications REQ-SPC required for remote operation of the target mobility 100-X are considered. A first remote operator terminal 200-X that meets the required terminal specifications REQ-SPC is assigned to remote operation of the target mobility 100-X. This ensures the accuracy of remote operation of the target mobility 100-X. This also avoids a situation in which a remote operator terminal 200 that does not have the required terminal specifications REQ-SPC is assigned to the target mobility 100-X by mistake. This eliminates the need to start over the assignment process, and implements an efficient assignment process.

What is claimed is:

1. A remote operation system of remote operation of a mobility, the remote operation system comprising one or more processors configured to:

acquire terminal specification information indicating specifications of each of a plurality of remote operator terminals, wherein the terminal specification information includes operation system information indicating operation system capabilities regarding operation system of each of the remote operator terminals, and wherein the operation system capabilities include the number of inputs of a forward and reverse operation, the number of inputs of a lateral operation, and presence or absence of operation feedback, wherein the presence or absence of operation feedback indicates whether the remote operator terminal includes an operation reaction force mechanism that can generate an operation reaction force to the remote operator;

acquire required capability information indicating at least a required terminal specification that is a specification required for the remote operation of a target mobility, wherein the required terminal specification includes an operation system capability required for the remote operation of the target mobility; and assign a first remote operator terminal having at least the required operation system capability to the remote operation of the target mobility, based on the operation system information and the required terminal specification.

2. The remote operation system according to claim 1, wherein the one or more processors are further configured to receive a remote operation request indicating either or both of a type of the target mobility and content of the remote operation of the target mobility, and recognize the required terminal specification required for the remote operation of the target mobility, based on the remote operation request.

3. The remote operation system according to claim 2, further comprising one or more memories storing a table showing correspondence between the remote operation request and the required terminal specification, wherein the one or more processors are configured to recognize the required terminal specification corresponding to the remote operation request by referring to the table.

4. The remote operation system according to claim 1, wherein the terminal specification information includes display system information indicating display system capabilities regarding display system of each of the remote operator terminals, the required terminal specification includes a display system capability required for the remote operation of the target mobility, and the one or more processors are configured to assign the first remote operator terminal having at least the required display system capability to the remote operation of the target mobility, based on the display system information and the required terminal specification.

5. The remote operation system according to claim 4, wherein the display system capabilities include the number of monitors and the number of videos displayed simultaneously.

6. A remote operation management method of managing remote operation of a mobility by a computer, the remote operation management method comprising:

acquiring terminal specification information indicating specifications of each of a plurality of remote operator terminals, wherein the terminal specification information includes operation system information indicating operation system capabilities regarding operation system of each of the remote operator terminals, and wherein the operation system capabilities include the number of inputs of a forward and reverse operation, the number of inputs of a lateral operation, and presence or absence of operation feedback, wherein the presence or absence of operation feedback indicates whether the remote operator terminal includes an operation reaction force mechanism that can generate an operation reaction force to the remote operator;

acquiring required capability information indicating at least a required terminal specification that is a specification required for the remote operation of a target mobility, wherein the required terminal specification includes an operation system capability required for the remote operation of the target mobility; and assign a first remote operator terminal having at least the required operation system capability to the remote operation of the target mobility, based on the operation system information and the required terminal specification.

7. A non-transitory storage medium storing instructions of managing remote operation of a mobility that are executable by one or more processors and that cause the one or more processors to perform functions comprising:

acquiring terminal specification information indicating specifications of each of a plurality of remote operator terminals, wherein the terminal specification information includes operation system information indicating operation system capabilities regarding operation system of each of the remote operator terminals, and wherein the operation system capabilities include the number of inputs of a forward and reverse operation, the number of inputs of a lateral operation, and presence or absence of operation feedback, wherein the presence or absence of operation feedback indicates whether the remote operator terminal includes an operation reaction force mechanism that can generate an operation reaction force to the remote operator;

acquiring required capability information indicating at least a required terminal specification that is a specification required for the remote operation of a target mobility, wherein the required terminal specification includes an operation system capability required for the remote operation of the target mobility; and assign a first remote operator terminal having at least the required operation system capability to the remote operation of the target mobility, based on the operation system information and the required terminal specification.

* * * * *